United States Patent [19]
Rodney

[11] Patent Number: 5,886,303
[45] Date of Patent: Mar. 23, 1999

[54] METHOD AND APPARATUS FOR CANCELLATION OF UNWANTED SIGNALS IN MWD ACOUSTIC TOOLS

[75] Inventor: Paul F. Rodney, Spring, Tex.

[73] Assignee: Dresser Industries, Inc., Dallas, Tex.

[21] Appl. No.: 954,508

[22] Filed: Oct. 20, 1997

[51] Int. Cl.⁶ .................................................. G01V 1/40
[52] U.S. Cl. ...................... 181/102; 181/108; 181/112; 367/38
[58] Field of Search ..................... 181/102, 108, 181/112; 367/25, 38; 73/152.16, 152.46, 152.47; 175/40, 50

[56] References Cited

U.S. PATENT DOCUMENTS

| | | |
|---|---|---|
| 3,982,606 | 9/1976 | Berry et al. . |
| 4,153,815 | 5/1979 | Chaplin et al. . |
| 4,215,425 | 7/1980 | Waggener . |
| 4,590,593 | 5/1986 | Rodney . |
| 4,796,237 | 1/1989 | Hutchens et al. . |
| 4,872,526 | 10/1989 | Wignall et al. . |
| 5,036,945 | 8/1991 | Hoyle et al. . |
| 5,229,553 | 7/1993 | Lester et al. . |
| 5,274,606 | 12/1993 | Drumheller et al. . |
| 5,309,404 | 5/1994 | Kostek et al. . |
| 5,343,001 | 8/1994 | Cowles et al. ........................ 181/102 |
| 5,357,481 | 10/1994 | Lester . |
| 5,371,330 | 12/1994 | Winbow . |
| 5,418,335 | 5/1995 | Winbow . |
| 5,467,320 | 11/1995 | Maki . |
| 5,475,731 | 12/1995 | Rasmusson . |
| 5,501,285 | 3/1996 | Lamine et al. . |
| 5,510,582 | 4/1996 | Birchak et al. . |
| 5,639,997 | 6/1997 | Mallett . |

FOREIGN PATENT DOCUMENTS

| | | |
|---|---|---|
| 2266372 | 10/1993 | United Kingdom . |
| 2300048 | 10/1996 | United Kingdom . |

OTHER PUBLICATIONS

J. Aron et al: "Sonic Compressional Measurements While Drilling," SPWLA 35th Annual Logging Symposuim, Jun. 19–22, 1994, pp. 1–17.

J. Minear et al: "Compressional Slowness Measurements While Drilling," SPWLA 36th Annual Logging Symposium, Jun. 26–29, 1995, pp. 1–12.

C. Kimball et al: "Semblance processing of borehole acoustic array data." Geophysics, vol. 49, No. 3, Mar. 1984, pp. 274–281.

A.L. Kurjian et al: "Slowness estimation from sonic logging waveforms," Geoexploration, 27 (1991), pp. 215–256.

C. Morris et al: "A New Sonic Array Tool for Full Waveform Logging," SPE 13285 (Society of Petroleum Engineers of AIME), pp. 1–7.

*Primary Examiner*—Khanh Dang
*Attorney, Agent, or Firm*—Kammer & Huff, PLLC

[57] ABSTRACT

An apparatus and method are disclosed for eliminating a noise signal from at least one source during an acoustic measurement of a subsurface geological formation or borehole. The apparatus includes a longitudinal body for positioning in the borehole and a transmitter supported by the body for transmitting acoustic signals into the formation and borehole. A sensor, substantially isolated within the body, is used to detect one or more noise signals and a receiver is carried by the body for receiving acoustic signals traversing the formation and borehole, and for receiving one or more noise signals. A processor is connected to the sensor and receiver for processing the acoustic signals and noise signals coupled from the receiver and the noise signal coupled from the sensor into a preferred formation or borehole signal by determining the noise signal received at the receiver using the noise signal received in the sensor and a propagation factor for the noise signal between the sensor and receiver. The determined noise signal is used to identify and eliminate the noise signals from the acoustic signals traversing the formation and borehole.

29 Claims, 7 Drawing Sheets

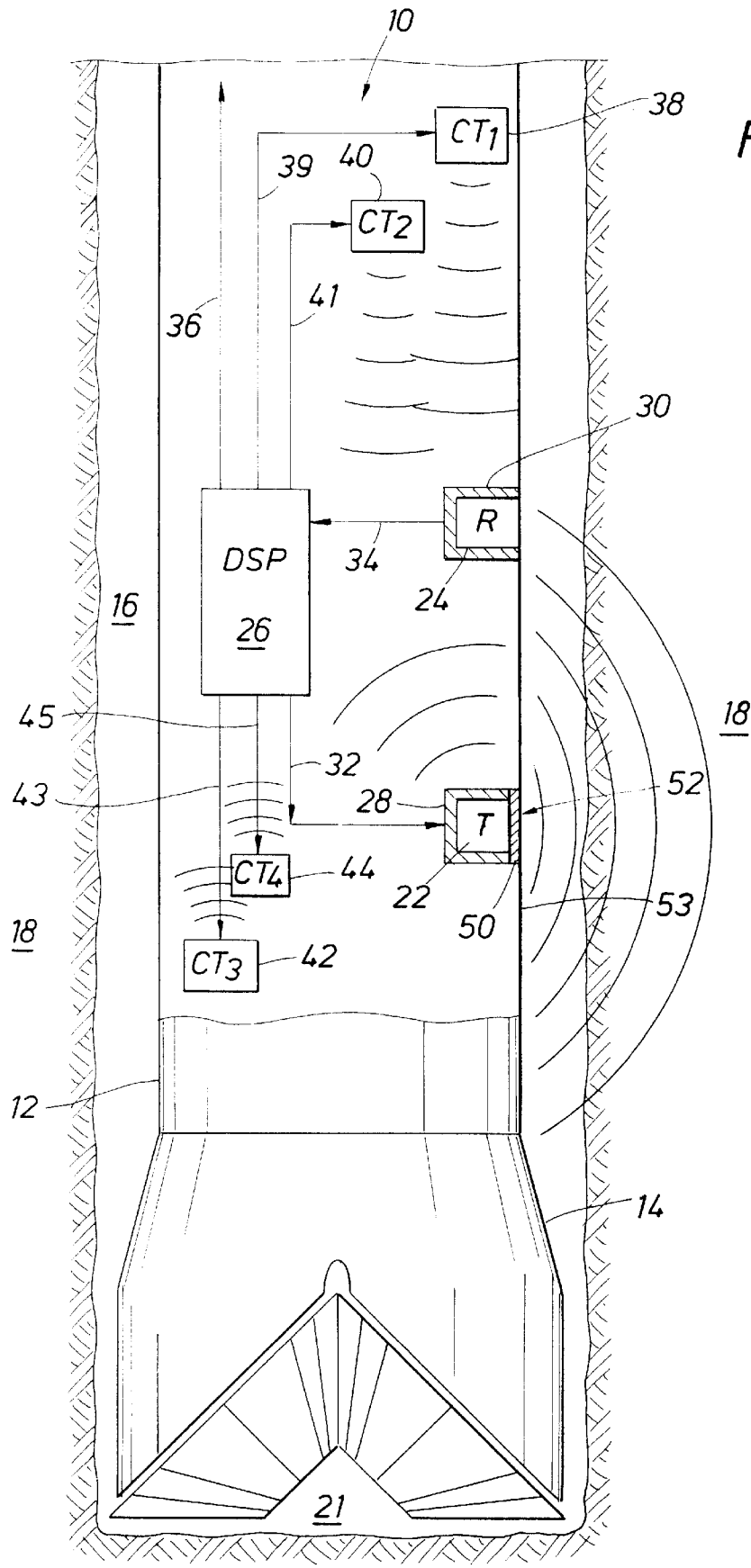
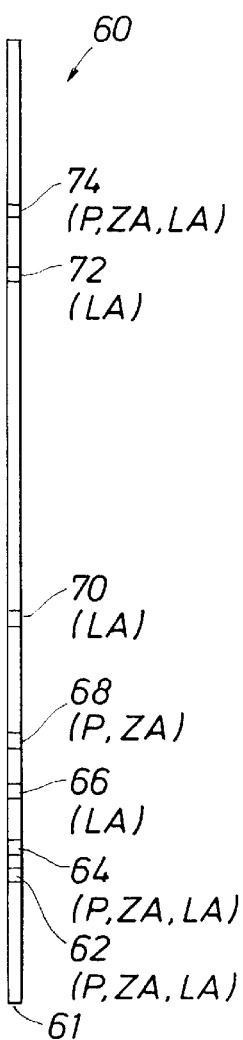
FIG. 2
FIG. 4

METHOD AND APPARATUS FOR CANCELLATION OF UNWANTED SIGNALS IN MWD ACOUSTIC TOOLS

FIELD OF THE INVENTION

The present invention is directed to an improved acoustic downhole logging apparatus and method for canceling unwanted acoustic noise received during the measurement of borehole and formation characteristics while drilling. More particularly, the present invention relates to a measurement while drilling ("MWD") acoustic tool that eliminates unwanted acoustic noise propagating through the formation, borehole and/or tool body from the acoustic signals received by a receiver in the MWD tool, thus creating an improved signal indicative of various properties of the formation or borehole.

BACKGROUND OF THE INVENTION

Acoustic logging tools for measuring various formation properties adjacent a borehole are well known. Measurement of subsurface geological formations may be taken by wireline logs after the well has been drilled or by MWD tools during the drilling of a well, sometimes referred to as an earth borehole. In either application, bulk porosity and elastic properties of the formation may be derived by measuring formation resistivity, neutron, gamma ray and sonic velocities. Important information taken from sonic logs may be used in a variety of applications, including correlation between wells, seismic plots, porosity determination, lithology determination, detection of overpressured formation zones, and the conversion of a seismic time trace to an indication of varying lithology based upon the velocity of sonic waves in the earth formation.

Typically, in a drillstring used in drilling an earth borehole, an MWD acoustic or sonic logging tool includes a sonic source positioned at one location along the drill collar to transmit to one or more locations positioned along the drill collar. The sonic source emits acoustic energy that propagates into the formation and which also travels along the borehole through the borehole fluid. Receivers in the drill collar detect the acoustic energy which comes from the formation to determine the acoustic velocity in the formation. Normally, both the shear wave velocity and the compressional wave velocity in the formation are greater than the velocity of acoustic waves in the borehole fluid. The difference in propagation times of the various acoustic signals allows their separation and measurement. For example, a typical prior art acoustic signal is generated to propagate through the borehole fluid and the formation, as well as along the logging tool body itself, to at least one receiving transducer. Depending upon the various propagation effects of the acoustic signal traveling along the tool body, and through the borehole and the formation, two or more receiving transducers may be necessary. The time it takes for the acoustic energy to propagate from the transmitter to a receiver, or from one receiver to another receiver, is then measured. Since the commence time of the transmission is known and the time of the first arrival of acoustic energy at each receiver after having passed through the formation is measured, the propagation time of the signal through the formation, referred to as "interval transit time," is thus determined. Variations in interval transit time, either between the transmitter and one or more receivers, or between receivers in one or more receiver pairs are thus measured and calculated in a conventional sonic Delta-T Sensor as part of the MWD tool, "T" being an abbreviation for time. A Sonic Delta-T sensor, like many other sensors, is simply an array of sensors designed to measure borehole or formation properties. Although sonic logs provide valuable information for various formation properties, certain disadvantages exist in either application due to "propagation effects" of the transmitted acoustic signals through the formation and the borehole fluid, as well as along the drill collar.

During drilling of the well, a number of different paths are available for acoustic energy propagation. Energy propagating along one path travels through the earth formation surrounding the borehole, while energy propagating along another path travels through the annular space between the borehole and the exterior surface of the drill collar, normally filled with drilling fluid. Energy propagating along another path travels directly through the drill collar at an acoustic velocity typically greater than the acoustic velocity of the formation and which may reverberate through the drill collar housing the acoustic logging sensors and associated circuitry.

Depending upon the path or paths along which the acoustic energy propagates, the acoustic energy may propagate as certain wave fields or modes which include: (1) compressional, torsional and lateral waves that propagate along and through the tool itself , (2) compressional waves that propagate within the borehole; (3) compressional and shear waves that propagate through the formation; and (4) leaky-p, tube and pseudo-Rayleigh waves that propagate along the interface between the formation and borehole.

In borehole logging, studies of the different acoustic modes propagating in the formation or at the formation/borehole interface provide information about the elastic contents of the formation, rock texture, porosity, fluid content, rock fracturing, and other data. For quantitative analysis, it is necessary to isolate the various waveform modes. Consequently, conventional logging tools are designed to suppress undesired waveforms (noise) either by structural design or by post-processing software.

It is normally desired that the detected signal remain free of any acoustic energy emitted by the transmitter into the tool body and propagating along and through the tool body to the one or more receivers. Since the speed of sound in the borehole or in the tool body is usually faster than that of the formation, the tool signal and the borehole signal arrivals in such cases usually occur before the formation signal arrives. Since the sonic logging device merely records signals as they are received, it is difficult to distinguish whether a signal has traversed the borehole, the formation or the tool body. Thus, such first arriving signals propagating through the borehole and/or the tool body may falsely be assumed to be first arriving signals propagating through the formation.

Although various solutions have been developed in the wireline logging industry for attenuating or suppressing the propagated tool signal so that formation arrival may be detected without interference from the propagated tool signal, such solutions are generally limited to an alteration of the structural design of the wireline tool which are not feasible for use on MWD tools. For example, since wireline tools are not required to function as a load bearing member, it is possible to form an array of staggered openings along the length of a sidewall of the wireline tool's housing. The openings serve to lengthen the total path that a housing propagated acoustic signal must follow. As a result, the signal is not only delayed, but is also attenuated due to the increased path length and additional openings that the scattered signal must traverse.

In MWD applications, however, the acoustic tool is incorporated into a drill collar which must be able to withstand the immense forces and accelerations encountered during the drilling of the well. Numerous holes or indentations in the sidewalls of the drill collar would weaken the collar so that it would not be able to withstand normal wear and tear during drilling operations. Moreover, the fluid isolation between the inside of the drill collar and its exterior would be lost or reduced. Additionally, conventional convoluting of the sidewall of an acoustic tool so that the tool takes on a uniform thickness, yet tortuous longitudinal cross-section, is equally problematic in that such shapes either are too weak or require an impractically large portion of the limited diameter of the tool.

One attempt to resolve the propagation of an acoustic signal traveling through a wireline tool body is found in U.S. Pat. No. 5,036,945 to Hoyle et al. Hoyle et al disclose a sonic well tool having a first and second attenuation and delay apparatus for attenuating and delaying the signal traversing the tool body. The first attenuation and delay apparatus includes interleaved rubber and metal-like washers for attenuating compressional and flexural waves propagating along the tool body, and a bellows section having a corrugated shape and a thin traversed dimension. The second attenuation and delay apparatus includes a mass loading ring surrounding the housing of the well tool, and a bellows section having a corrugated shape and a thin traverse dimension.

U.S. Pat. No. 5,229,553 to Lester et al discloses an acoustic isolator for use with a well logging tool having transducers in a first and third tool segment which are to be acoustically isolated from receivers in a second and fourth tool segment. The acoustic isolator consists of vertebrate links of spools encased by resilient boots which are arranged end to end in tandem configuration. A plurality of split shells interconnect the spools by externally gripping the boots covering the end portions of the respective adjacent spools.

U.S. Pat. No. 4,872,526 to Wignall et al, deals with a wireline logging tool that utilizes various mechanical means for isolating the transmitter from the receiver.

Since most solutions to resolving the "propagation effects" of an acoustic signal traveling through a wireline tool body are impractical for use on MWD tools, and it is preferable to measure characteristics of the formation adjacent the well bore in a timely fashion while drilling, a number of different attempts have been made to remove unwanted acoustic noise as a result of the "propagation effects" of a transmitted acoustic signal using an MWD tool.

For example, U.S. Pat. No. 5,467,320 to Maki, Jr. discloses an acoustic formation apparatus having first and second receivers with a common azimuth spaced vertically along the drill stem and connected, respectively, to first and second amplifiers, first and second band pass filters, first and second clipping circuits, a single delay circuit and a cross-correlating circuit. The signals are received, filtered, amplified, clipped, delayed, and then cross-correlated utilizing variable time delays. The resulting cross-correlation function is analyzed using a microprocessor which removes stationary correlation peaks and ignores very short correlation delay times. This enables removal of the substantially fixed aspect of the drill pipe transmitted signal and the very fast propagating waves so that the processed cross-correlation function output is substantially related to the formations and the larger, overpowering signal transmitted along and through the drill collars is substantially avoided.

Another example is U.S. Pat. No. 5,357,481 to Lester et al which discloses an MWD borehole logging tool having a sonde constructed of a plurality of segments that are axially rotatable with respect to each other. Each one of two of the segments includes a compartment in which is mounted a dipoled bender bar transmitting transducer. Two additional segments each contain one or more binaurally sensitive receiver transducers. Monopole transmitting and receiving transducers are also included in the respective appropriate segments. An acoustic isolator separates the transmitting transducers from the receiving transducers. The borehole logging tool is said to be capable of reducing noise during the acoustic logging process such as: (1) random noise by use of multiple receivers to make redundant measurements, and (2) phasing the receivers to exclude noise from certain directions.

U.S. Pat. No. 3,982,606 to Drumheller et al, deals with the suppression of acoustic noise from a transmitter, through a borehole, to a receiver, utilizing mechanical means to obstruct the travel path of unwanted acoustic signals traveling within the borehole fluid between the transmitter and the receiver. Thus, the obstructed path will delay the arrival time of the unwanted acoustic signals at the receiver.

U.S. Pat. No. 5,475,731 to Rasmusson discloses an echo canceling system and method in a cellular telephone system using an echo estimate to modify an error signal which is obtained by the difference between an echo signal and the echo estimate. The modified error signal, rather than the error signal itself, is transmitted. By using the echo estimate as a parameter for modifying the error signal, improved hands free performance may be obtained in a cellular telephone. The echo estimate signal is transmitted with the original signal in order to cancel the echo error when it is received.

U.S. Pat. Nos. 5,418,335 and 5,371,330 to Winbow disclose first and second end acoustic sources and an intermediate acoustic source positioned to enhance the signal to noise ratio and substantially eliminate tube wave interference. Each first end and second end acoustic source create a partial acoustic pressure null proximate the first and second longitudinal ends of the apparatus, thereby preventing at least a portion of the intermediate source acoustic pressure waves from propagating through the borehole beyond the longitudinal ends of the apparatus. Consequently, tube wave dominance in the regions above and below the apparatus is minimized by the creation of the near zero acoustic pressure condition around and beyond each end of the apparatus using the first end and second end acoustic sources to block the tube wave affect of the intermediate acoustic source from propagating through the borehole above and below the apparatus.

U.S. Pat. No. 5,309,404 to Kostek et al pertains to reducing the effects of quadrupole and higher order moments of acoustic signals transmitted from a transversely mounted acoustic source in a MWD tool by angular displacement of the receiver such that the quadrupole mode of the acoustic signal is rendered insignificant. In another embodiment, a plurality of receivers are uniquely positioned to eliminate the quadrupole mode by timing each receiver's individual signal to obtain a resulting signal by the summation of the individual signals and averaging the same to eliminate the quadrupole mode.

U.S. Pat. No. 5,274,606 to Drumheller et al presents an electronic circuit for digitally processing analog electrical signals produced by at least one acoustic transducer. Preconditioned data is used to counteract distortions caused by the drill string, the distortion corresponding to the effects of multiple pass bands and stop bands having characteristics dependent upon the properties of the drill string. The preconditioned data is transmitted to the first end of the drill string and detected at a second end of the drill string.

U.S. Pat. No. 4,796,237 to Hutchens et al is directed to determining the presence of defects in cement surrounding a casing set within a well bore by using the amplitude of the casing reverberation noise from a known signal source such as a transmitter, and the time between the transmission of the known signal and the reception of the first casing reverberation noise. This amplitude and delay time are then used to eliminate the casing reverberation noise by either transmitting a series of negative signals having amplitudes equal to the immediately preceding received acoustic reverberation at a time later than the positive signal so that the acoustic reverberations are driven to a null, or scaling the amplitude of the known signal delayed a time between the transmission of the known signal and the reception of the signal, and subtracting the scaled signal from the stored known signal to generate or refine a signal from which casing reverberation noise has been removed. In either method, the noise signal is known and since the transmitter abuts the casing adjacent the surrounding cement, propagation effects due to other borehole noise are not considered.

U.S. Pat. No. 4,590,593 to Rodney deals with an electronic noise filtration system for use in improving the signal to noise ratio of acoustic data transmitted from a downhole transducer in a MWD system. A pair of acoustic receiving transducers are spaced apart on a given flow path for generating a respective output signal responsive to acoustic pulses propagating through the drilling fluid. The difference in output signals of the transducers is determined by selectively delaying one of the output signals to a difference determining means and which is then compared to the difference during the absence of purposely-generated downhole data to effectively minimize the difference and eliminate acoustic noise in the flow path.

U.S. Pat. No. 4,153,815 to Chaplin et al discloses a method of reducing the amplitude of vibrations received at a selected location from a source of reoccurring noise by feeding to the location a specifically generated secondary vibration which at least partially nulls the vibrations from the noise source at the selected location. A triggering signal derived from the selected source is used to synchronize the generation of the secondary vibration with that of the vibration to be at least partially nulled. Since the noise source is reoccurring, the amplitude of the vibrations is known and the cancellation signal may be easily simulated. However, the process relies solely on the derivation of a cancellation signal from a known source. Noise originating from unknown sources cannot easily be estimated and/or eliminated. Moreover, the process does not provide for distinguishing between a preferred signal hidden within an unknown noise signal that arrives simultaneously at a receiver as noise.

U.S. Pat. No. 4,215,425 to Waggener relates to a communication system and apparatus for receiving and interpreting data signals being telemetered to the surface of the earth in an MWD system. A filter is provided for use and detection in a phase shift keying transmission system of the type where modulation is achieved by temporary interdirectional modification of a carrier frequency.

U.S. Pat. No. 5,510,582 to Birchak et al provides an apparatus for sonic well logging having at least one transmitter and at least one receiver. Positioned between the transmitter and receiver is an acoustical attenuation section intended to attenuate sonic waves traversing the sonic logging tool. This acoustical attenuation section generally includes one or more fluid filled cavities in the sonic logging tool, into which are inserted inertial masses. The cavities are generally shaped to receive the attenuators and are slightly larger so that a gap will exist between the walls of the cavities and the inertial masses (attenuators) as the attenuators are positioned in the cavity. Therefore, the tool body, the fluid and the inertial masses are designed to act together to mechanically attenuate undesired acoustic signal propagation.

British Patent Number GB 2,266,372 A to Scherbatskoy discloses a sonic logging arrangement having an MWD telemetry system in which a drilling fluid pump at the earth's surface circulates drilling fluid through a drill string and produces a high differential pressure between the inside and outside of the string, thereby producing acoustic pressure waves in the formation surrounding the borehole.

British Patent Number 2,300,048 A and U.S. Pat. No. 5,639,997 to Mallett is directed to an acoustic noise canceling apparatus for well logging that is said to cancel interfering signals propagating through the tool body by transmitting an acoustic signal into the formation that also traverses the tool body for receipt by two receivers. The first receiver is isolated, receiving only the acoustic signal propagating through the tool body, and the second receiver receives acoustic signals traversing both the formation and the tool body. A processor then subtracts the tool signal of the first receiver from the combined tool and formation signal of the second receiver resulting in a single formation signal. The apparatus is restricted to canceling noise from a known signal such as a transmitter, and does not take into account propagation effects resulting from the signal passing through the borehole fluid and/or the formation. Moreover, the apparatus is limited to placing each isolated first receiver immediately adjacent each second receiver precluding the ability to consider propagation effects of multiple noise signals propagating from above and below the tool body.

Other publications of general interest describing mechanical means for suppressing noise interference and signal processing of sonic arrays in MWD tools include:

J. Aron, S. K. Chain, R. Dworak, K. Hsu, T. Lau, J-P. Masson, J. Mayes, G. McDaniel, C. Randall, S. Kostek, T. J. Plona, *Sonic Compressional Measurements While Drilling*, SPWLA 35th Annual Logging Symposium, Jun. 19–22, 1994, paper SS.

John Minear, Robert Birchak, Carl Robbins, Eugene Linyaev, Bruce Mackie, David Young and Robert Malloy, *Compressional Slowness Measurements While Drilling*, SPWLA 36th Annual Logging Symposium, Jun. 26–29, 1995, paper VV.

Christopher V. Kimball, Thomas L. Marzetta, *Semblance processing of borehole acoustic array data*, Geophysics, Vol. 49, No. 3, March, 1984, pp 274–281.

A. L. Krkijan, S. W. Lang, and K. Hsu, *Slowness estimation from sonic logging waveforms*, Geoexploraton, Vol. 27, 1991, pp 215–256.

C. F. Morris, T. M. Little, and W. Letton, III, *A New Sonic Array Tool for Full Waveform Logging*, 59th Annual Technical Conference and Exhibition, Sep. 16–19, 1984, paper SPE 13285.

In view of the prior art and its limitations, a specific need exists to provide an apparatus and method for determining a preferred acoustic signal indicative of borehole and/or formation characteristics by eliminating acoustic noise signals that may propagate through the drill collar or tool body, as well as the formation, borehole and borehole/formation interface as acoustic measurements are taken using an MWD tool.

OBJECTS OF THE INVENTION

It is therefore the primary object of the present invention to provide a method and apparatus for determining an improved signal indicative of borehole and/or formation characteristics by eliminating one or more acoustic noise signals that may propagate through the drill collar or tool body as well as through the formation, the borehole and the interface between the borehole and the formation as acoustic measurements are taken.

It is also an object of the present invention to provide a method and an apparatus capable of distinguishing a preferred signal indicative of borehole or formation properties that is included within, or masked by a noise signal by differentiating the preferred signal from such noise signal.

It is another object of the present invention to provide a method and an apparatus for acoustically measuring the properties of the borehole or formation that is capable of determining one or more noise signals received at one or more receivers using one or more noise signals detected by one or more sensors and a propagation factor between each sensor and receiver.

It is another object of the present invention to provide a method and an apparatus to acoustically measure borehole or formation properties that eliminates one or more noise signals by digitally filtering the determined noise signals from the acoustic signals traversing the formation and/or borehole detected at the receiver.

It is another object of the present invention to provide a method and an apparatus to acoustically measure borehole or formation properties that eliminates one or more noise signals by sending an amplitude inverted noise signal to a compensating transducer positioned to transmit a cancellation signal that eliminates the noise signals from the preferred acoustic signals traversing the borehole or formation.

It is another object of the present invention to provide a method and apparatus for eliminating a plurality of noise signals utilizing a plurality of sensors positioned such that their outputs can be processed so as to separate out each of the noise components.

It is another object of the present invention to provide a method and an apparatus to acoustically measure borehole or formation properties that eliminates a plurality of noise signals utilizing at least one sensor positioned to detect one noise signal propagating from one direction toward the sensor, and at least one other noise signal propagating from another direction toward the sensor.

SUMMARY OF THE INVENTION

It is a feature of the present invention to provide a method and an apparatus to acoustically measure borehole or formation properties that is capable of distinguishing from, and eliminating a noise signal in the form of compressional wave noise propagating through the apparatus, from the preferred acoustic signal traversing the borehole or formation.

It is another feature of the present invention to provide a method and an apparatus to acoustically measure the borehole or formation properties that is capable of distinguishing from, and eliminating a noise signal in the form of torsional wave noise propagating through the apparatus from the preferred acoustic signal traversing the borehole or formation.

It is another feature of the present invention to provide a method and an apparatus to acoustically measure borehole or formation properties that is capable of distinguishing and eliminating a noise signal in the form of lateral wave noise propagating through the apparatus from the preferred acoustic signal traversing the borehole or formation.

It is another feature of the present invention to provide a method and an apparatus to measure borehole or formation properties that is capable of distinguishing and eliminating a noise signal in the form of compressional wave noise propagating through the borehole to each receiver or tube wave noise propagating along the interface between the borehole and formation.

It is another feature of the present invention to provide a method and an apparatus to acoustically measure borehole or formation properties that eliminates a noise signal generated by precessional movement of the apparatus and random vibration coupled to at least one of sensor such apparatus.

It is another feature of the present invention to provide a method and an apparatus to acoustically measure borehole or formation properties that eliminates or diminishes a noise signal generated by a drill bit used in drilling an earth borehole.

It is another feature of the present invention to provide a method and an apparatus for acoustically measuring borehole or formation properties utilizing one or more propagation factors in the form of transfer functions to estimate noise signals received at at least one receiver in an acoustic well logging system.

These and further objects, features and advantages of the present invention will become apparent from the following detailed description of the preferred embodiment of the present invention.

The present invention is directed to an apparatus and method for eliminating noise signal or signals from at least one source during an acoustic measurement of a subsurface geological formation or borehole. The apparatus includes a longitudinal body for positioning in the borehole and a transmitter supported by the body for transmitting acoustic signals into the formation and borehole. A sensor, substantially isolated within the body, is used to detect a noise signal and a receiver is carried by the body for receiving acoustic signals traversing the earth formation and the borehole, and one or more noise signals. A processor is connected to the sensor and receiver for processing the desired acoustic signals and the undesired noise signals coupled from the receiver and the noise signal coupled from the sensor into a preferred formation or borehole signal by determining the noise signal received at the receiver using the noise signal received at the sensor and a propagation factor for the noise signal between the sensor and receiver. The determined noise signal is used to identify and eliminate the noise signals from the acoustic signals traversing the formation and borehole.

In a preferred embodiment, the processor eliminates the noise signals from the acoustic signals to obtain a preferred signal by digitally filtering the determined noise signals from the combined acoustic signals and noise signals coupled from the receiver. Depending upon whether the borehole or formation characteristics are to be measured, the processor is programmed with the known transmitter compressional wave noise propagating through either the borehole or formation and its corresponding propagation factor in order that the preferred signal may be determined by eliminating the determined compressional wave noise propagating through either the borehole or formation. The mud, borehole and formation properties are incorporated into the propagation factor whenever an unknown noise signal propagating through the borehole or along the interface between the borehole and formation must be determined. Whenever the noise signals propagate only along and through the tool body, the propagation factor is either analytically determined, or preferably by experimentation using a noise measurement sub tool without regard to mud, borehole and formation properties. Similarly, the transmitter signal propagating along and through the tool body as compressional wave noise may be easily processed and filtered from the preferred signal since the transmitter signal and corresponding propagation factor are known in advance.

In another embodiment, the processor eliminates the noise signals from the acoustic signals to obtain a preferred signal by sending an amplitude inverted determined noise signal to a compensating transducer positioned within the tool body that transmits a cancellation signal at each receiver. This procedure requires calibration of the transmitter and compensating transducers. During calibration of the transmitter, the transmitter must remain isolated from acoustic communication with the formation and borehole in order to receive a true transmission factor between the transmitter and receiver without any noise interference. Preferably, the transmitter is calibrated at the earth's surface to avoid noise interference. However, a moveable shield may be positioned between the transmitter and an aperture in a wall of the tool body for calibrating the transmitter by limiting the transmission of the acoustic signals from the transmitter to the confines of the tool body when the moveable shield is in a closed position. When the moveable shield is removed from between the aperture and the transmitter, the acoustic signals may then be freely transmitted from the transmitter into the borehole and formation, as well as along and through the tool body itself Similarly, a plurality of compensating transducers may be substantially isolated within the tool body to transmit a plurality of cancellation signals towards a receiver for eliminating a plurality of noise signals from the acoustic signals received at such receiver. Each compensating transducer is connected to the processor for generating each respective cancellation signal that corresponds to a separate noise signal. Preferably, each cancellation signal is generated according to transmission factors determined for each compensating transducer after the transducers have been calibrated. The transmission factors enable the cancellation signal to be sent by each compensating transducer to arrive at the same time as the noise signal arrives at such receiver after propagating through the borehole, formation and/or tool body.

The acoustic signals are preferably transmitted by the transmitter at a frequency from essentially zero hertz up to 250 khz, depending upon the application, in analog form. The acoustic signals and unknown noise signals received by the receiver are sent in analog form to the processor which includes a converter for converting the analog acoustic signals and unknown noise signals to a digital form. Although the transmitter and receiver are positioned within the tool body and are open to the borehole, the transmitter and receiver are surrounded by an isolation material in order to minimize the interference from any noise signals propagating through the tool body. The processor is positioned, preferably in the tool body, and connected to the transmitter for causing the acoustic signal to be transmitted into the borehole and formation. However, the processor may be located on the earth's surface, if desired.

In the event that two or more separate noise signals from separate sources are present or the same noise signal is propagating from two different directions (e.g., up and down the tool body or clockwise and counterclockwise around the periphery of the tool body), then a plurality of sensors may be isolated within the tool body. In the latter case, each of the sensors is positioned to detect unknown noise signals propagating toward the sensors. In the former situation, one sensor is positioned to detect noise signals propagating from above and below the body and another sensor is positioned to detect noise signals propagating from above and below the body. Thus, the detection of one or more noise signals from one or more sources may be used with a corresponding propagation factor to estimate the noise signals received by the receiver. The processor is preferably connected to each sensor and the receiver for processing into a preferred signal or signals the acoustic signals and noise signals sent from the receiver and each noise signal sent from each sensor, by determining each noise signal received at the receiver using each noise signal received at each sensor and a propagation factor between each sensor and each receiver. Each determined noise signal is then used to identify and sequentially eliminate each noise signal from the acoustic signals defining the preferred signal. The sequential elimination of each noise signal received at the receiver may be arbitrary, or may follow a predetermined pattern.

One source of a noise signal may be precessional movement of the tool body or random vibration coupled to one or more of the sensors. In the event the source of the noise signal is precessional movement of the tool body or random vibration coupled to the sensor, the sensor must be substantially isolated within the tool body adjacent the receiver to detect the noise signal. A more common source of noise signals, however, is the rotational, longitudinal and lateral movements of a drill bit as the drillstring rotates and continues drilling the borehole.

If the elimination of a particular noise signal propagating along and through the tool body is desired, a separate sensor is isolated within the tool body for detecting each noise signal propagating from the same direction. Thus, a p-wave (compressional) sensor may be positioned to detect a noise signal in the form of compressional wave noise. Another sensor may be an accelerometer positioned to detect a different noise signal in the form of lateral or torsional wave noise.

If, however, the elimination of a particular noise signal propagating through the borehole or at the interface between the borehole and formation is desired, then the noise signal must be determined by scaling the noise signal detected by a sensor positioned to detect compressional wave noise that propagates through the tool body and incorporating mud, borehole and formation properties into the propagation factor for the noise signal between the sensor and the receiver. This may apply to either compressional wave noise propagating through the borehole, or tube wave noise propagating along the interface between the borehole and formation.

In the operation of the system according to the present invention, a longitudinal tool body, usually embodied in a drill collar within a drillstring, is positioned in the borehole. An acoustic signal is then transmitted into the borehole and formation from an acoustic transmitter supported by the tool body. Acoustic signals traversing the borehole and the formation, and the noise signals are received at an acoustic receiver supported by the tool body. The noise signals are also detected by an acoustic sensor substantially isolated within the tool body and selectively positioned to detect the noise signals. The acoustic signals traversing the borehole and the formation and the noise signals coupled from the receiver and the noise signals coupled from the sensor are then processed into a preferred signal indicative of the borehole or formation properties by a processor used to determine the noise signals received at the receiver using the noise signals received at the sensor and also to determine the propagation factor for the noise signals between the sensor and the receiver. The determined noise signals are then used to identify and eliminate the noise signals from the acoustic signals traversing the borehole and formation.

The noise signals may be eliminated from the acoustic signals traversing the borehole and formation by either digitally filtering the determined noise signals from the acoustic signals and the noise signals coupled from the receiver or by inverting the amplitude of the determined noise signals and in directing the inverted signals to a compensating transducer positioned within the tool body that transmits a cancellation signal towards the receiver.

BRIEF DESCRIPTION OF THE DRAWINGS

FIG. 2 is an elevated, diagrammatic view of a drill bit, a drill collar and an alternative embodiment of the acoustic tool of the present invention positioned within such drill collar;

FIG. 4 is an elevated, diagrammatic view of a sonic noise measurement sub in accord with the present invention.

DETAILED DESCRIPTION OF PREFERRED EMBODIMENTS

Figure 1:
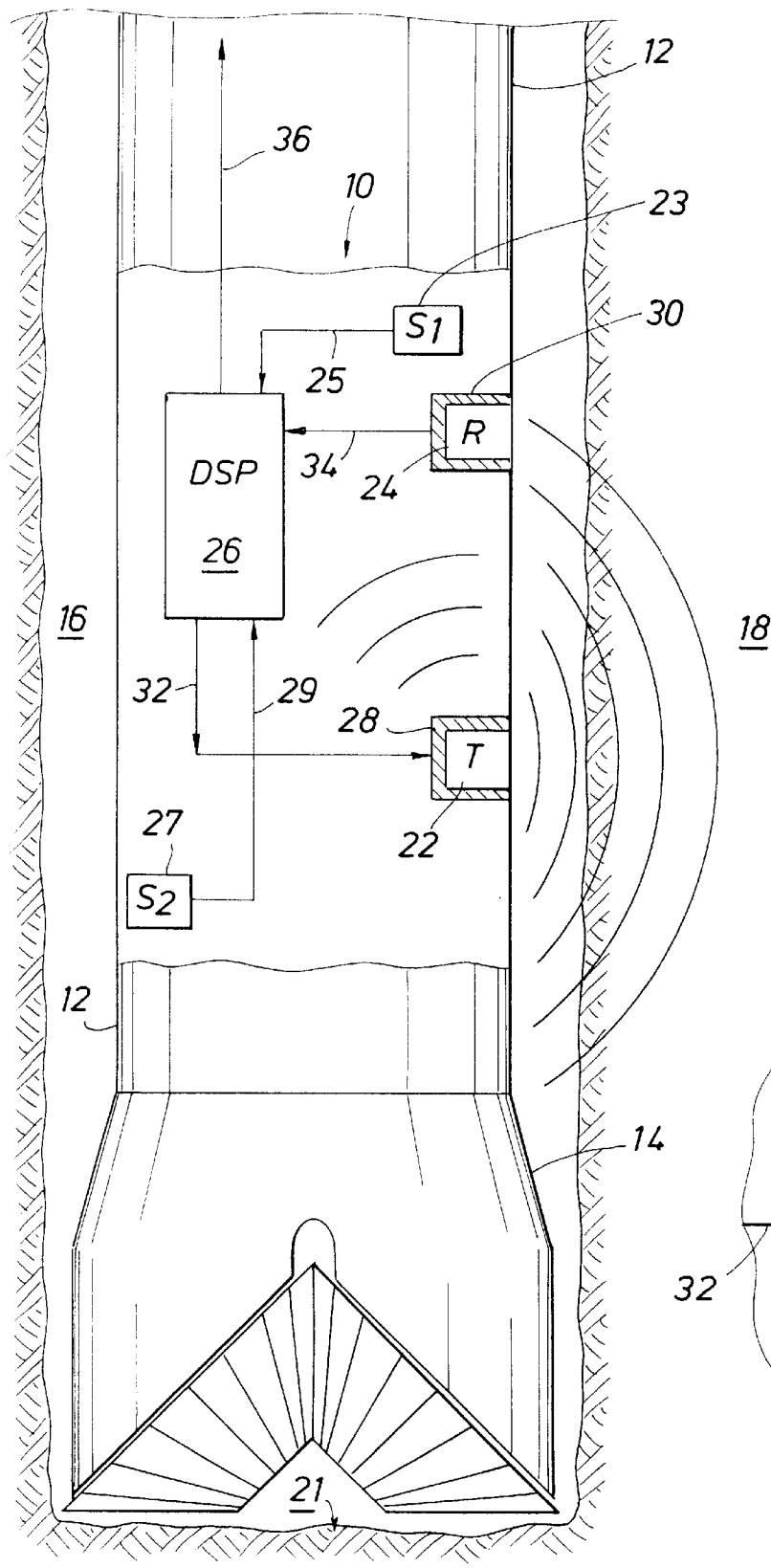
FIG. 1 is an elevated, diagrammatic view of a drill bit, a drill collar and the acoustic tool of the present invention positioned within the drill collar.

With reference now to FIG. 1, the acoustic tool 10 of the present invention is a longitudinal body positioned within a drill collar 12 above a drill bit 14. The drill bit 14 drills a borehole 16 through an earth formation 18 by rotating into a subterranean surface 21 causing one type or source of acoustic noise that propagates through the fluid-filled borehole 16 as compressional waves, through the formation 18 as compressional and shear waves, along and through the drill collar 12 as compressional, torsional and lateral waves and along the interface between the formation 18 and borehole 16 as leaky-p, tube and pseudo-Rayleigh waves. Other sources causing acoustic noise may be precessional movement of the drill collar 12 as the borehole 16 is formed by the drill bit 14, and random vibration within the borehole 16 acting on the drill collar 12.

The acoustic tool 10 is generally used as a measuring device or tool that is capable of analyzing the borehole and/or formation properties while drilling, which is generally referred to as an MWD tool. Additionally, the acoustic tool 10 is typically referred to as an "interval transit time" sensor or sonic delta-T sensor that measures the borehole and/or formation characteristics while drilling, by emitting pulses of acoustic energy into the borehole and formation that are reflected back as data to be analyzed and interpreted. Although the acoustic tool 10 in the preferred embodiment of the present invention resembles a sonic delta-T sensor, the present invention may be used on other types of borehole sensors designed to look ahead of the drill bit 14 or to its side.

The acoustic transmitter 22 is supported within the tool body 10 axially above the drill bit 14 adjacent the borehole 16 and formation 18 for transmitting acoustic signals into the borehole 16 and formation 18. The transmitter 22 is connected to the processor 26 by a circuit 32 to allow the processor 26 to energize the transmitter 22 to cause acoustic signals to be transmitted into the borehole 16 and formation 18.

An acoustic receiver 24 is supported within the tool body 10 axially above the drill bit 14 adjacent the borehole 16 and formation 18 for receiving the acoustic signals traversing the borehole 16 and the formation 18 and one or more noise signals. The receiver 24 is connected to the processor 26 by circuit 34.

A first acoustic sensor 23 is substantially isolated within the tool body 10 above the receiver 24 and connected to the processor 26 by a circuit 25 for detecting a noise signal propagating from above the tool body 10 toward the first sensor 23. A second acoustic sensor 27 is substantially isolated within the tool body 10 positioned below the receiver 24 and connected to the processor 26 by a circuit 29 for detecting the same or another noise signal propagating from below the tool body 10 toward the second sensor 27. It should be appreciated that the acoustic sensors 23 and 27 are themselves acoustic receivers, in the same sense as that of receiver 24, and may only be different in a structural sense if required by the construction of the tool 10. When two or more separate noise signals from separate sources are present, additional sensors (not shown) are positioned to detect a separate noise signal propagating from the same direction toward the additional sensors. An arrangement of sensors, such as the first and second sensor 23 and 27, may be required for each unknown noise signal that propagates within the tool body 10 from above and below the receiver 24. Similarly, a plurality of receivers (not shown) may be supported by the tool body 10 for receiving the acoustic signals traversing the borehole 16 and the formation 18, contingent upon the formation characteristics and desired transmission direction of the acoustic signals.

Although the transmitter 22 and receiver 24 are positioned within the tool body 10 and are open to the borehole 16, the transmitter 22 and receiver 24 are partially surrounded (on their sides and backwalls) by acoustic isolation materials 28 and 30, respectively, that reduces the acoustic interference from any noise signals that propagate along and through the tool body 10. The acoustic signals are transmitted by the transmitter 22 through the borehole 16 into the formation 18 at a frequency up to approximately 250 kHz in analog form. The reflected acoustic signals and noise signals received by the receiver 24 are sent in analog form to the processor 26 which includes an A/D converter, for converting the analog acoustic signals and noise signals into corresponding digital signals.

The processor 26 is preferably positioned within the tool body 10 and transmits borehole and/or formation data to the earth's surface (not shown) through a circuit 36. Alternatively, the processor 26 may be positioned at the earth's surface requiring either that the raw data from the receiver 24 and the sensors 23 and 27 be stored in a downhole recorder or transmitted to the earth's surface via mud pulse telemetry, neither of which are illustrated, but both of which are conventional and well-understood by those skilled in this art. The processor 26 processes the acoustic signals and the noise signals coupled from the receiver 24 and the noise signal coupled from each first and second sensor 23 and 27 into a preferred borehole or formation signal by determining each unknown noise signal received at the receiver 24. The determination is made by using each noise signal received at the first and second sensors 23 and 27 and a propagation factor between each first and second sensor 23 and 27 and the receiver 24. Each determined noise signal processed by the processor 26 is then used to identify and sequentially eliminate each noise signal from the acoustic signals traversing the borehole 16 and formation 18. The sequential elimination of each determined noise signal received at the receiver may be arbitrary, or may follow a given pattern.

In the preferred embodiment, the processor 26 eliminates each noise signal from the acoustic signals to obtain a preferred signal by digitally filtering each determined noise signal from the combined acoustic signals and noise signals coupled from the receiver 24.

EXAMPLE 1

Depending upon whether the borehole 16 or formation 18 characteristics are to be measured, the processor 26 is programmed with the transmitter noise propagating through either the borehole 16 or formation 18 as compressional waves, and its corresponding propagation factor in order that the preferred signal may be determined by eliminating the compressional wave noise propagating along and through the tool body and through either the borehole 16 or formation 18. The mud, borehole 16 and formation 18 properties are incorporated into the propagation factor whenever a noise signal propagating through the borehole 16 or along the interface between the borehole 16 and formation 18 must be determined. Whenever the noise signals propagate through the tool body only, the propagation factor may be analytically determined or preferably by experimentation using a noise measurement sub 60 (FIG. 4) without regard to the drilling fluid (mud), borehole 16 and formation 18 properties. Similarly, the transmitter signal propagating along and through the tool body 10 as compressional wave noise may be easily processed and filtered from the preferred signal since the transmitter signal and corresponding propagation factor are known in advance.

Accordingly, the detection of one or more noise signals from one or more sources as thus described, may be used with a corresponding propagation factor to estimate the noise signals received by the receiver 24.

In the event that the noise signal is limited to either compressional wave noise, torsional wave noise or lateral wave noise that propagates along and through the tool body 10, then only a first sensor 23 is necessary for determining the noise signal received by the receiver 24. A measurement must be taken within the tool body 10 by the first sensor 23 responsive to the particular noise, but not responsive to the desired acoustic signals. In addition, the first sensor 23 is positioned to detect only one type of particular noise such as compressional wave noise, however, additional sensors may be positioned within the tool body 10 to detect other types of noise propagating through the tool body 10 as explained below under EXAMPLE 2. Therefore, different types of sensors are required to detect different types of noise signals. For example, a p-wave sensor may be positioned to detect a noise signal in the form of compressional wave noise. Another sensor, in the form of an accelerometer, may be positioned to detect a different unknown noise signal in the form of lateral or torsional wave noise.

Once the noise signal has been detected by the first sensor 23 and sent to the processor 26, a propagation factor or transfer function between the first sensor 23 and the receiver 24 is used with the noise signal detected by the first sensor 23 in order to determine the noise signal at the receiver 24. The transfer function for a given type of noise may be analytically derived or experimentally obtained using the noise measurement sub 60 depicted in FIG. 4.

Transfer functions are a frequency domain concept and apply to linear systems. For a single input linear system with a transfer function $H(\omega)$ and input $I(\omega)$, the output $O(\omega)$ of the system is given by: $O(\omega)=H(\omega)\times I(\omega)$. In order to better understand the derivation of transfer functions experimentally using a noise measurement sub 60, reference is now made to FIG. 4 wherein the noise measurement sub 60 is outside the borehole but also may be used in the borehole 16 to experimentally obtain various transfer functions of noise signals encountered at one or more points along the noise measurement sub 60. The determinations may be analyzed in a laboratory to derive transfer functions that then may be utilized by the processor 26 for eliminating the noise signals from the acoustic signals traversing the borehole 16 and formation 18. The noise measurement sub 60 incorporates 14 transducers that sort out upgoing and downgoing acoustic waves, measure compressional waves at a number of positions along the sub 60 resembling a drill collar 12; and, measure lateral vibrations at a number of positions in order to correlate the vibrations with the compressional wave measurements to ultimately obtain the transfer functions to be used in the present invention. The transducers are positioned on the noise measurement sub 60 from a lowermost reference point 61, hypothetically defining the location of the drill bit 14 with respect to the drill collar 12 corresponding to FIG. 1. The transducers in sub 60 include: (1) compressional wave transducers (p) for measuring the effects of compressional waves traveling in the borehole 16; (2) Z axis or vertical accelerometers (ZA) for measuring the effects of waves propagating longitudinally through the noise measurement sub 60; and (3) lateral accelerometers (LA) for measuring the effects of lateral noise propagating along and through the drill collar 12. The various transducers are positioned on the noise measurement sub 60 for determination of various transfer functions corresponding with the various types of noise signals from different sources that may propagate along and through the tool body 10 from a given point on the noise measurement sub 60 corresponding to receipt of the noise signal at the first sensor 23 versus the receipt of a noise signal at the receiver 24. Although the preferred positioning of the transducers preferably involves a noise measurement sub with a diameter of 6¾", thus matching the diameter of the drill collar, the positioning is not critical and other locations may be used depending upon the size of the drill collar, and upon conditions in the borehole 16, and upon the diameter of the sub 60. Additionally, if the noise measurement sub 60 inside/outside diameter, density or Youngs Modulis are significantly different from those assumed for the acoustic tool 10, it will be necessary to change the positioning and location of the respective transducers on the noise measurement sub 60 when building the acoustic tool 10 of the present invention.

In a first position 62 on sub 60, a compressional wave transducer, vertical accelerometer and lateral accelerometer are located as close to one another as possible as an additional reference point for each of the three types of measurements to be taken of acoustic noise. Preferably, the longitudinal spacing between the accelerometers at the first position 62 relative to the reference point 61 is about 78 inches. A compressional wave transducer, vertical accelerometer and lateral accelerometer are also located at a second position 64 approximately 83 inches from the reference point 61 in order to avoid spatial aliasing at the highest frequency of interest (50 kHz). Alternatively, the transducers from the second position 64 may be repositioned at two new locations. The first, a distance of approximately 124 inches from the reference point 61 including both a compressional wave transducer and vertical accelerometer; the second new location including only a lateral accelerometer at a distance of approximately 133 inches from the reference point 61. Another lateral accelerometer is located at a third position 66 approximately 98 inches from the reference point 61 and 19 inches from the lateral accelerometer at the first position 62.

At a fourth position 68, a compressional wave transducer and vertical accelerometer are included approximately 112 inches from the reference point 61 and preferably 33 inches from the corresponding transducers located at the first position 62. A single lateral accelerometer is located at a fifth position 70 approximately 145 inches from the reference point 61 and an additional lateral accelerometer is located at a 6th position 72 approximately 294 inches from the reference point 61. Spacing of each lateral accelerometer at the fifth and sixth positions (70 and 72, respectively) relative to the corresponding lateral accelerometer at the first position 62 is preferably 66 inches for the fifth position lateral accelerometer 70 and 215 inches for the sixth position lateral accelerometer 72.

Finally, a compressional wave transducer, vertical accelerometer and lateral accelerometer are each located at a seventh position 74 approximately 315 inches from the reference point 61. The positioning of the transducers at the seventh position 74 was selected in order to place the vertical accelerometer at a distance of one wavelength at one kHz, through steel, from the vertical accelerometer at the first position 62. A compressional wave transducer is needed at a seventh position 74 partially for stacking and semblance processing. Alternatively, the lateral accelerometer may be eliminated from the seventh position 74, and, if a 16-channel data acquisition system is used, it may be desirable to add another compressional wave transducer, vertical axis accelerometer and lateral accelerometer at another position (not shown) approximately 281 inches from the reference point 61. For signal processing purposes, it is most desirable that at least four transducers of each type are positioned on the noise measurement sub 60.

Thus, having experimentally determined the transfer function for the first sensor 23 positioned to detect only one noise signal propagating from the same direction in the tool body 10 in the form of compressional wave noise, the noise signal may be determined at the receiver 24. The technique for eliminating the noise will be illustrated using an analytical expression for the transfer function between two points within a cylindrical rod. Assuming the unknown noise signal is observed at the first sensor 23 a distance x from the drill collar 12, and the drill collar length is L and the wave speed is $V_p$:

$$H_{xB}(\omega) = \frac{1}{\sqrt{2\cdot\pi}} \cdot \left[ \frac{e^{\frac{-i\cdot\omega\cdot x}{V_p}} + R\cdot e^{\frac{i\cdot\omega\cdot x}{V_p}}\cdot e^{\frac{-2i\cdot\omega\cdot L}{V_p}}}{1R^2\cdot e^{\frac{-2i\cdot\omega\cdot L}{V_p}}} \right] \quad (1)$$

In this equation (1), R is a reflection coefficient and a noise signal n(t) is originating from below the tool body 10. The signal resulting from n(t) is monitored at x1 and x2. The noise signal may thus be determined at the receiver 24 (x2) from the transfer function $H_{xB(\omega)}$ and the noise signal measured by the first sensor 23 at x1.

Defining $N(\omega)$ as the Fourier transform of the noise signal at the bottom of the sub, then define the Fourier transform of the noise signal observed at x1 as $S1(\omega)$ and define the Fourier transform of the noise signal observed at x2 as $S2(\omega)$. The following equations may then be derived:

$$S1(\omega) = H_{x1B}(\omega) \cdot N(\omega) \quad (2)$$

$$S2(\omega) = H_{x2B}(\omega) \cdot N(\omega) \quad (3)$$

$$S2(\omega) = \frac{H_{x2B}(\omega)}{H_{x1B}(\omega)} \cdot H_{x1B}(\omega) \cdot N(\omega) \text{ thus:} \quad (4)$$

$$S2(\omega) = \frac{H_{x2B}(\omega)}{H_{x1B}(\omega)} \cdot S1(\omega) \quad (5)$$

A digital filter is constructed in accord with conventional digital filtering techniques as part of the processor 26 to digitally eliminate the determined noise signal from the acoustic signals sent from the receiver 24.

Referring now to FIGS. 1A–1F, examples are given demonstrating the process the processor 26 follows to eliminate noise signals from preferred formation or borehole signals. Assuming the drill bit 14 operates to produce one source of noise signal propagating upward through the tool body 10 to the receiver 24 and first sensor 23, the signal from the formation 18 is arbitrarily specified as an impulse of 10 samples beginning at sample 2048 [See FIGS. 1(C) and 1(F)]. The noise signal at the first sensor 23 and receiver 24 was directly synthesized and a known transfer function was directly modeled assuming the noise signal propagates at a constant velocity throughout the tool body 10 and is reflected from both ends of the tool body 10 with a reflection coefficient R. Thus, the transfer function includes reverberation in the tool body 10. Although this analysis proposes the estimation of the transfer function using direct modeling, experimentally determining the transfer function may be desirable under certain circumstances.

The transfer function was then applied to the noise signal from the first sensor 23 to determine the noise at the receiver 24. The determined noise signal was then used to eliminate the noise signal at the receiver 24, thus revealing the preferred acoustic signal traversing the formation 18.

The following parameters are used in the determination:
R=0.25
$V_p$=5000 m/s
L=10 m
x1=2 m
x2=0.667 m
Sample rate=20,000 samples per second with 4096 samples.

Figure 1A:
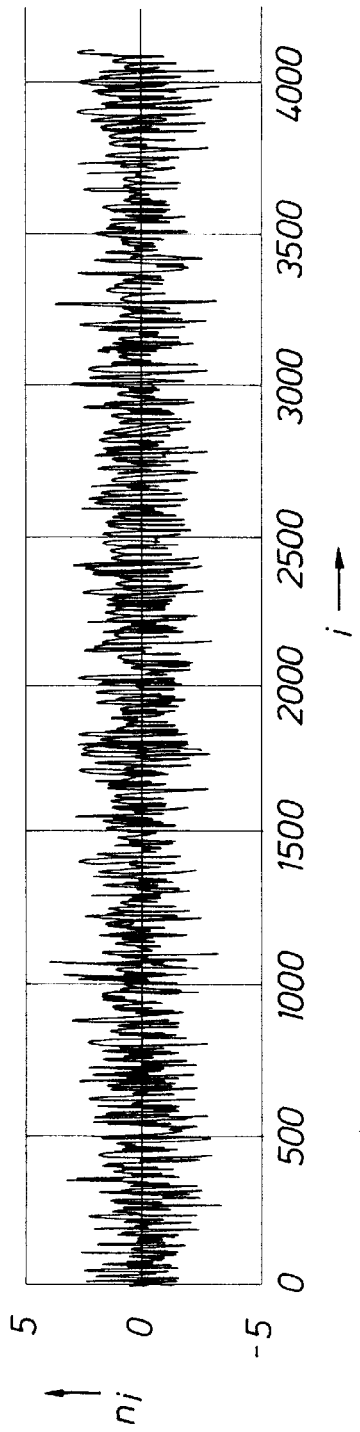
FIG. 1A is a graphic example of a noise signal detected from the bottom of the acoustic tool of the present invention where (i) is the sample number and the amplitude units for the noise signal are arbitrary.
Figure 1B:
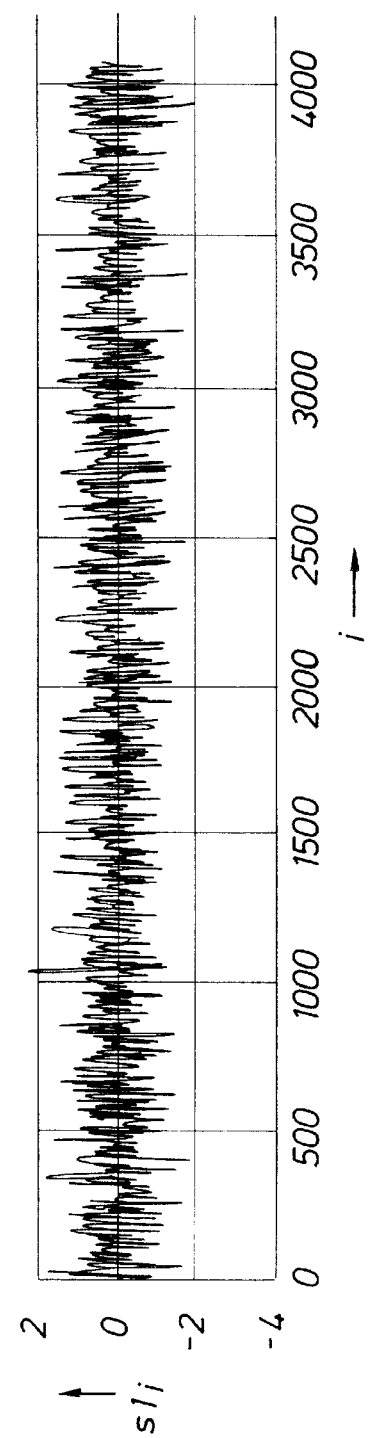
FIG. 1B is a graphic example of the unknown noise signal detected at a first sensor above the point of detection demonstrated in the example of FIG. 1A.
Figure 1C:
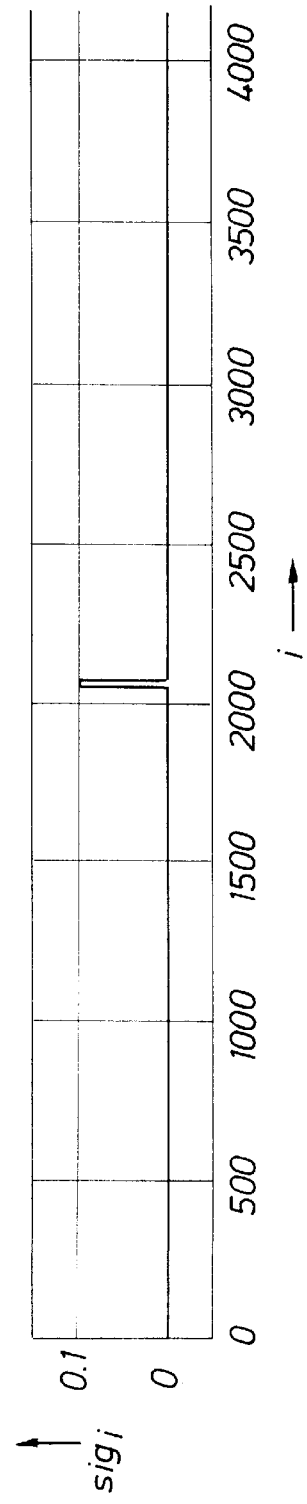
FIG. 1C is a graphic representation of the preferred acoustic signal that would be observed at a receiver without the interfering noise signal demonstrated in the graphic examples found in FIGS. 1A and 1B.
Figure 1D:
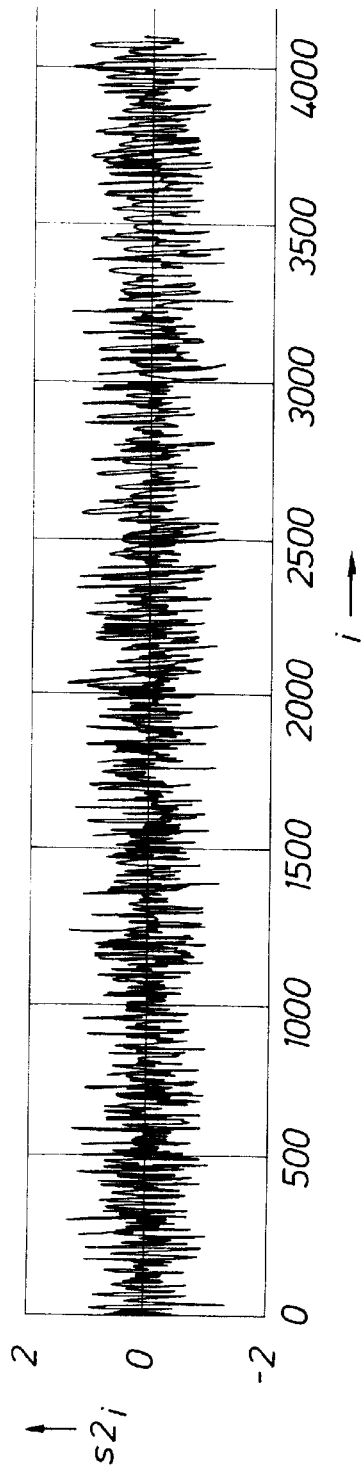
FIG. 1D is a graphic example of the preferred acoustic signal traversing the formation and the noise signal detected.
Figure 1E:
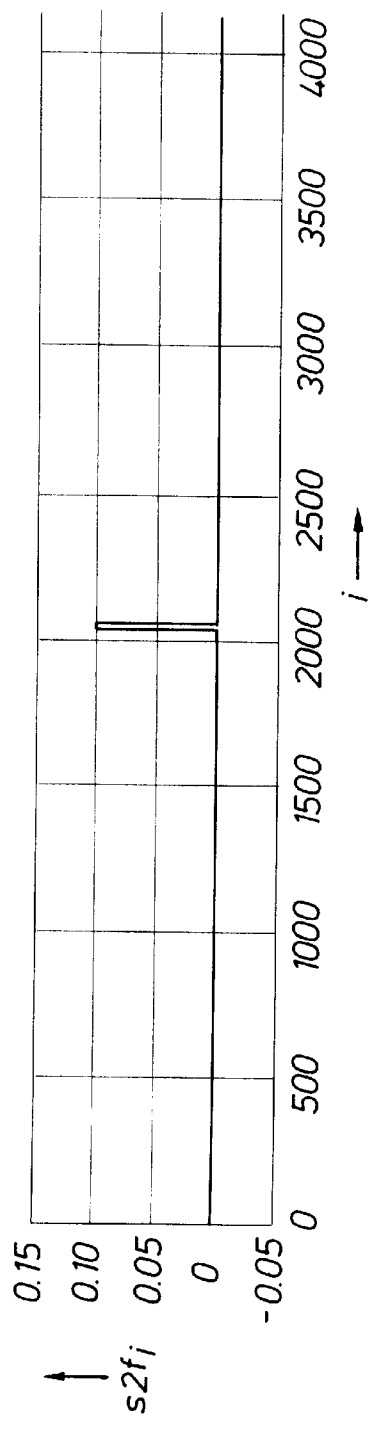
FIG. 1E is a graphic example of the preferred acoustic signal traversing the formation after digitally filtering the determined noise signal.
Figure 1F:
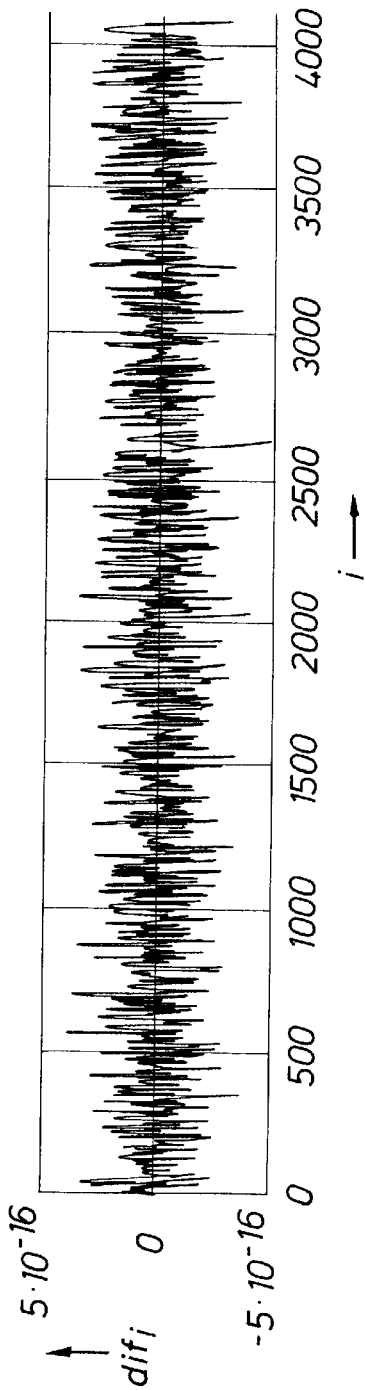
FIG. 1F is a graphic example confirming that the difference between the preferred acoustic signal traversing only the formation and the preferred acoustic signal obtained by digitally filtering the determined noise signal from the preferred acoustic signal traversing the formation and the noise signal detected at the receiver is clearly negligible.

FIG. 1A is a graphic example of the noise signal detected from the bottom of the acoustic tool 10 where (i) is the sample number and the amplitude units for the noise signal (n) are arbitrary. FIG. 1B is a graphic example of the noise signal detected at the first sensor 23 above the point of detection, i.e., the bottom of the tool 10 seen in FIG. 1A. FIG. 1C is a graphic representation of the preferred acoustic signal that would be observed at the receiver 24 without the interfering noise signal seen by the examples of FIGS. 1A and 1B. FIG. 1D is a graphic example of the preferred acoustic signal traversing the formation 18 and the noise signal received at the receiver 24. FIG. 1E reveals the preferred acoustic signal traversing the formation 18 after digitally filtering the determined noise signal from the same using the processor 26. FIG. 1F is a graphic example confirming the negligible difference between the acoustic signal traversing only the formation 18 and the acoustic signal obtained by digitally filtering the determined noise signal from the combined acoustic signals traversing the formation 18 and the noise signals coupled from the receiver 24.

EXAMPLE 2

Figure 1G:
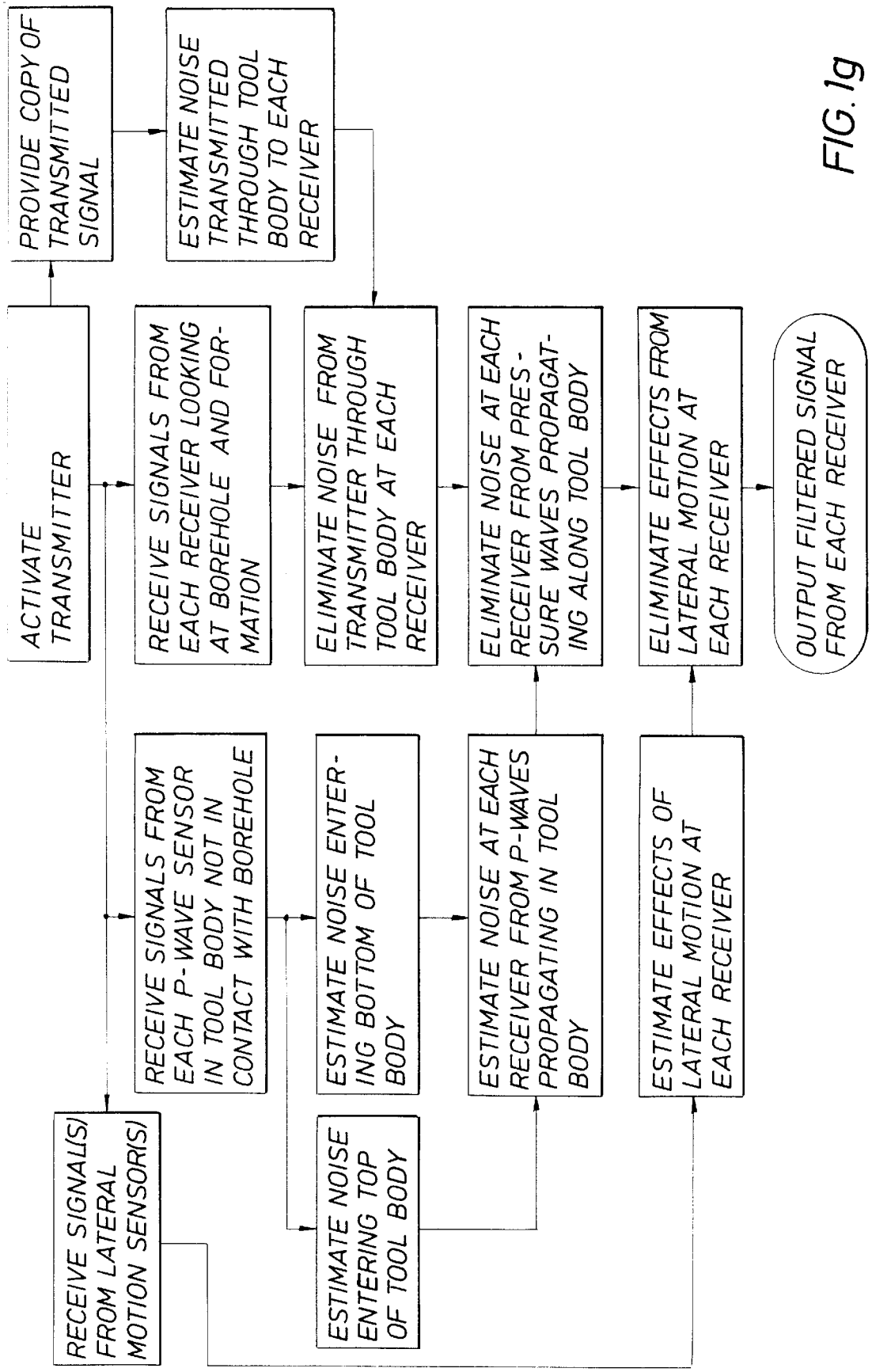
FIG. 1G is a process diagram of a preferred method for eliminating one or more noise signals that propagate along, through and around the acoustic tool of the present invention.

Typically, multiple different noise signals propagating from the same direction are present at the receiver 24 or, alternatively, the noise signals propagate toward the receiver 24 from opposite directions. In either case, an additional second sensor 27 is required in order to determine the noise signal at the receiver 24. In FIG. 1G, a process diagram is shown for simplifying the process carried out by the processor 26. In the following example, a noise signal propagates from the drill bit 14 up the drill collar 12 into the tool body 10 and a noise signal propagates from above the drill collar 12 down into the tool body 10 from precessional movement of the drill collar 12, or from any other cause. The noise signals are n1(t) and n2(t) originating at different points above and below the tool body 10. The first and second sensors 23 (p1) and 27 (p2) are shielded from the acoustic signals traversing the formation 18, and the receiver 24 (p3) is in acoustic communication with the acoustic signals traversing the borehole 16 and formation 18, and the unknown noise signals propagating from above and below the tool body 10.

Thus, in the absence of formation signals, the following equations are applied:

$$X1(\omega) = N1(\omega) \cdot H(\omega, p1) + N2(\omega) \cdot G(\omega, p1) \quad (6)$$

$$X2(\omega) = N1(\omega) \cdot H(\omega, p2) + N2(\omega) \cdot G(\omega, p2) \quad (7)$$

$$X3(\omega) = N1(\omega) \cdot H(\omega, p3) + N2(\omega) \cdot G(\omega, p3) \quad (8)$$

Where $N1(\omega)$ is the Fourier transform of n1(t),
$N2(\omega)$ is the Fourier transform of n2(t),
$H(\omega,p1)$ is the (frequency domain) transfer function from the location of noise source 1 to point p1,
$H(\omega,p2)$ is the transfer function from the location of noise source 1 to point p2,
$H(\omega,p3)$ is the transfer function from the location of noise source 1 to point p3,
$G(\omega,p1)$ is the transfer function from the location of noise source 2 to point p1,
$G(\omega,p2)$ is the transfer function from the location of noise source 2 to point p2,
$G(\omega,p3)$ is the transfer function from the location of noise source 2 to point p3,
$X1(\omega)$ is the Fourier transform of x1(t), the signal observed at p1,
$X2(\omega)$ is the Fourier transform of x2(t), the signal observed at p2, and
$X3(\omega)$ is the Fourier transform of x3(t), the signal observed at p3.

Using the equations derived above, $N1(\omega)$ and $N2(\omega)$ may be derived as:

$$N1(\omega) = \frac{(X1(\omega) \cdot G(\omega, p2) - X2(\omega) \cdot G(\omega, p1))}{-H(\omega, p2) \cdot G(\omega, p1) + H(\omega, p1) \cdot G(\omega, p2)} \quad (9)$$

$$N2(\omega) = \frac{(X1(\omega) \cdot H(\omega, p2) - X2(\omega) \cdot H(\omega, p1))}{-H(\omega, p2) \cdot G(\omega, p1) + H(\omega, p1) \cdot G(\omega, p2)} \quad (10)$$

$N1(\omega)$ and $N2(\omega)$ can now be used to make an estimate of the noise received at the receiver 24 or p3.

$$X3(\omega) = \frac{(X1(\omega) \cdot G(\omega, p2) - X2(\omega) \cdot G(\omega, p1))}{-H(\omega, p2) \cdot G(\omega, p1) + H(\omega, p1) \cdot G(\omega, p2)} \cdots + \quad (11)$$

$$\frac{-(X1(\omega) \cdot H(\omega, p2) - X2(\omega) \cdot H(\omega, p1))}{-H(\omega, p2) \cdot G(\omega, p1) + H(\omega, p1) \cdot G(\omega, p2)},$$

or, $$= X3(\omega) = I(\omega, p3) \cdot X1(\omega) + J(\omega, p3) \cdot X2(\omega)$$

$$I(\omega, p3) = \frac{(H(\omega, p3) \cdot G(\omega, p2) - H(\omega, p2) \cdot G(\omega, p3)}{-H(\omega, p2) \cdot G(\omega, p1) + H(\omega, p1) \cdot G(\omega, p2)} \quad (12)$$

$$J(\omega, p3) = \frac{(H(\omega, p3) \cdot G(\omega, p1) - H(\omega, p1) \cdot G(\omega, p3)}{-H(\omega, p2) \cdot G(\omega, p1) + H(\omega, p1) \cdot G(\omega, p2)} \quad (13)$$

Thus, by knowing the transfer functions between each first and second sensor 23 and 27 and the receiver 24, and by measuring the noise signals at the first and second sensors 23 and 27, the noise signal may be determined at the receiver 24 using the processor 26. This procedure is essentially the same for three or more noise signals, wherein as many equations as there are noise signals are solved simultaneously.

In some cases where there are multiple noise sources, each can be dealt with as a single noise signal. The effects of lateral motion on the receiver 24 may be eliminated independently from the effects of compressional noise propagating up and down the tool body 10 since lateral motion primarily effects the receiver 24, which is sensitive to the acoustic signals coming from the formation 18 and borehole 16 through coupling of momentum to the first and second sensors 23 and 27. Since the sensors used to detect lateral motion are accelerometers that are not sensitive to compressional wave noise, the effects of lateral motion may be compensated out separately.

Since the receiver 24 may detect many separate noise signals and acoustic signals traversing the borehole 16 and formation 18, the receiver 24 may also detect lateral vibration and torsional movement coupled to the receiver 24. In this event, the preferred acoustic signal propagating through either the borehole 16 or formation 18 is determined according to the method described above for eliminating compressional waves propagating through the borehole 16 or leaky-p, tube and/or pseudo-Rayleigh waves propagating at the interface between the borehole 16 and formation 18. However, the first 23 and second 27 sensors should be positioned to detect lateral or torsional wave noise that propagates through the tool body 10 as the reference signal.

EXAMPLE 3

Figure 1H:
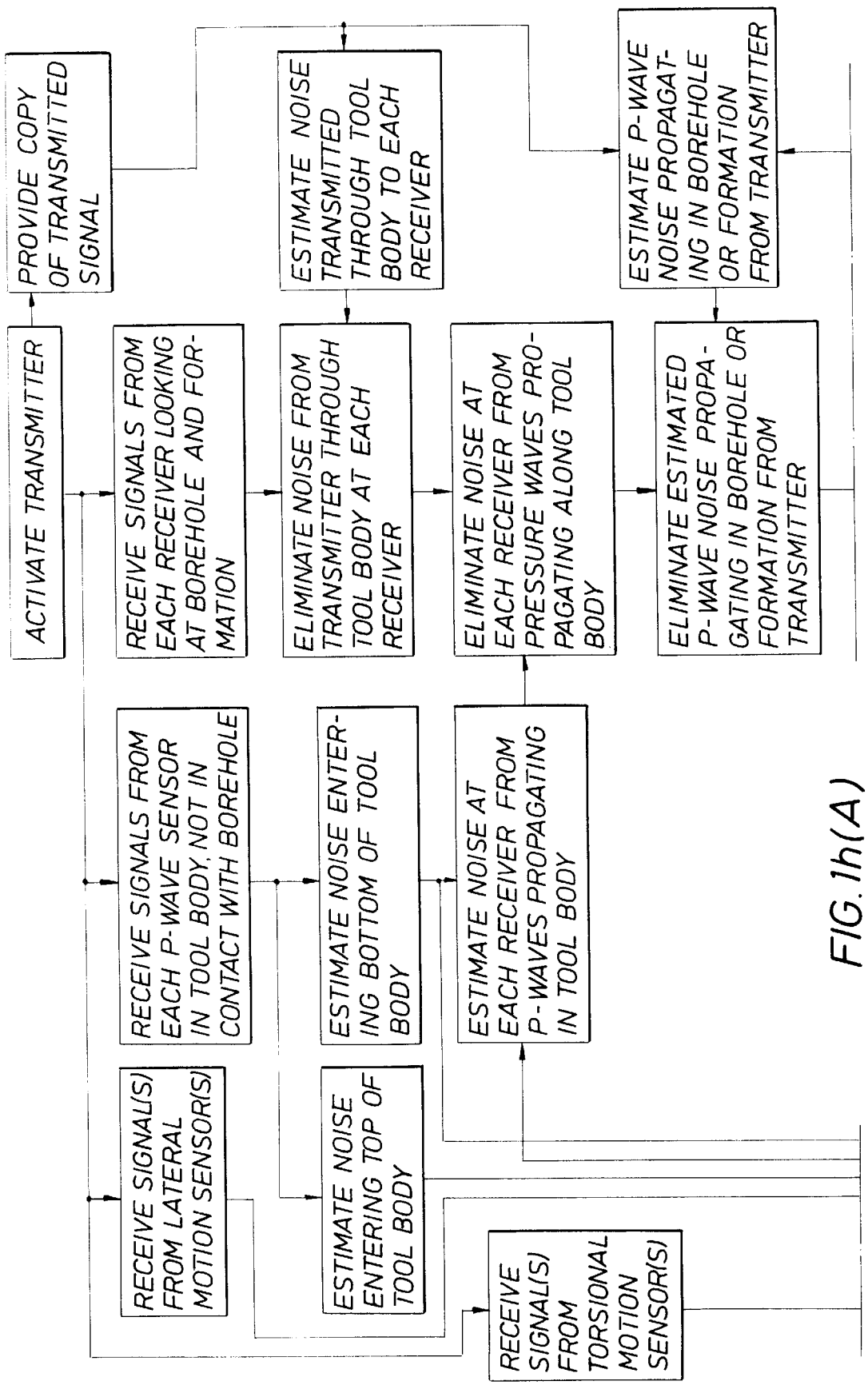
FIG. 1H is a process diagram of an alternative method of the present invention for eliminating one or more noise signals propagating along, through and around the acoustic tool of the present invention.
Figure 1H:
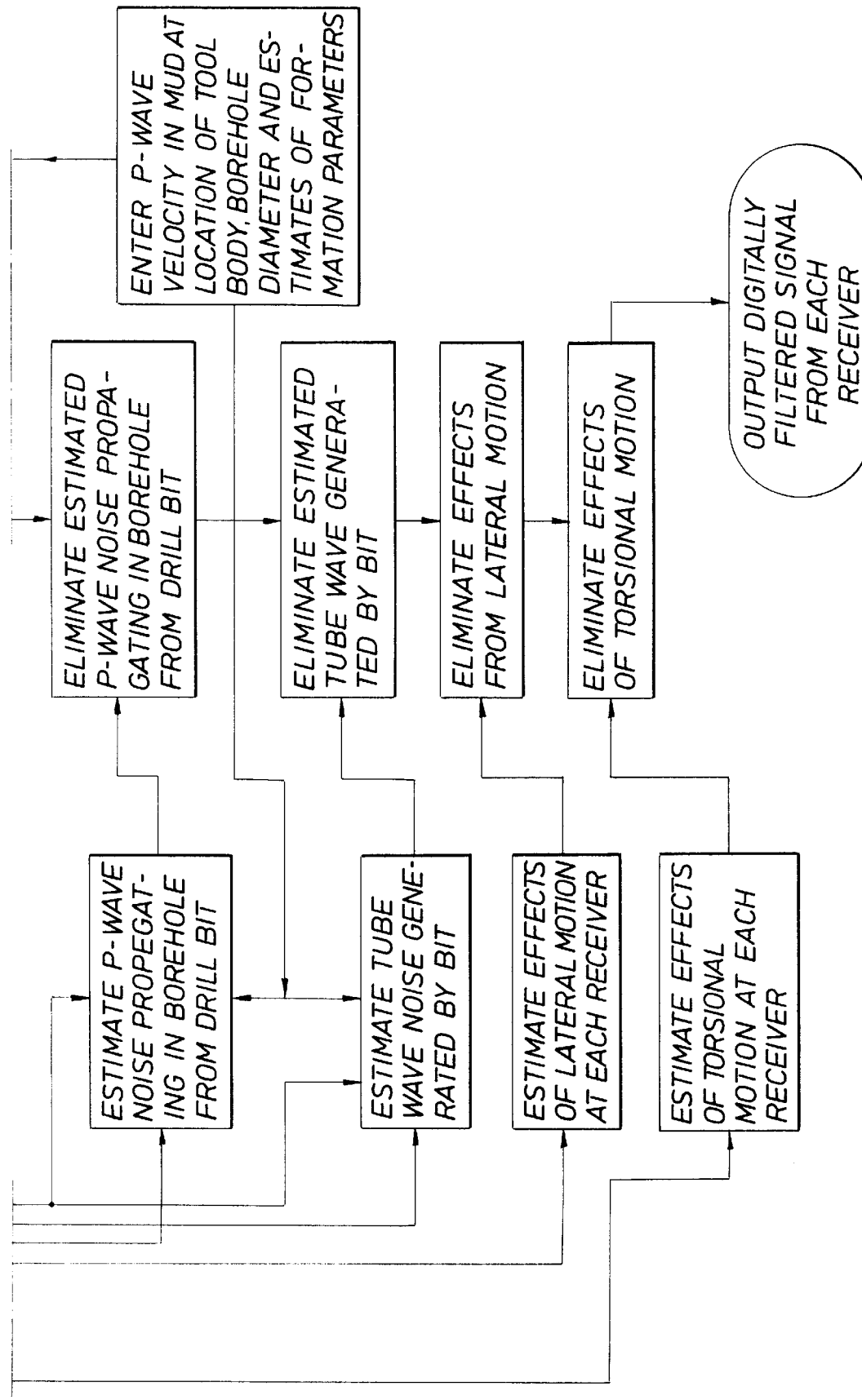

If the particular noise signals to be eliminated propagate as compressional waves through the borehole 16 or leaky-p, tube and/or pseudo-Rayleigh waves at the interface between the borehole 16 and formation 18, then a determination of these particular noise signals must be determined using another method generally depicted by the process diagram in FIG. 1H.

Since sensors are not available which can directly detect a particular noise signal propagating in the borehole 16 and the first and second sensor 23 and 27 are isolated from any acoustic signals outside the tool body 10, the first and second sensors 23 and 27 are positioned to detect noise signals propagating through the tool body 10 as compressional wave noise which are used as a reference to approximate the noise signals propagating outside the tool body 10 in the borehole 16, for example, as from the drill bit. The method explained in EXAMPLE 2 above may be used to determine one or more determined noise signals propagating in the tool body 10 from the noise signals detected by each first and second sensor 23 and 27. The resulting estimated unknown noise signals are then scaled using a coupling factor between the unknown noise signals propagating in the tool body 10 and the unknown noise signals propagating outside of the tool body 10 in the borehole 16. Determination of the coupling factor may be made utilizing an iterative technique, such as the well known Levenberg-Marqardt non-linear regression method. The scaled estimates are then multiplied by another propagation factor that incorporates mud, borehole and formation properties between the first and second sensor 23 and 27 and the receiver 24 to achieve final determinations of the noise signals propagating through the borehole 16 and/or at the interface between the borehole 16 and formation 18. The final determined noise signals are then eliminated from the preferred acoustic signals propagating through either the borehole 16 or formation 18 using the preferred method of digital filtering described above.

The mud, borehole and formation properties are preferably determined experimentally. However, such properties may be interpolated or extrapolated to cover cases which have not been determined experimentally. If interpolation or extrapolation is used, the interpolation or extrapolation should be based on a physical model if possible. In order to achieve an experimental model, it is useful to know the diameter and mechanical properties of the tool body 10, the diameter of the borehole 16, the acoustic properties of the mud, and the acoustical properties of the formation 18. The formation properties may be determined from wireline logs or from MWD logs. The diameter of the borehole 16 may be determined with an MWD acoustic caliper, for example, as set forth in copending U.S. patent application Ser. No. 08/920,929, filed Aug. 29, 1997, assigned to the assignee of this present application, or the acoustic tool 10 of the present invention wherein the processor 26 is used to process the combined acoustic signals traversing the borehole 16, formation 18 and noise signals coupled from the receiver 24 and noise signals coupled from the first and second sensor 23 and 27 into a preferred borehole signal. The processor 26 must be programmed to filter any noise signals propagating through the formation 18, which is easily accomplished knowing the signal from the transmitter 22 and its corresponding propagation factor. Alternatively, the size of the drill bit 14 may be used as a default value for the borehole diameter, while the other factors are either known or can be estimated from the drilling program. Since it may be difficult to directly apply these techniques while drilling in the borehole 16, the appropriate propagation factor incorporating mud, borehole and formation properties is preferably determined in advance and stored in the processor 26 for use while drilling.

Where simultaneous lateral motion and torsional or rotary motion are encountered in the form of precessional motion creating the noise signal propagating through the borehole 16, the effects of the lateral and torsional or rotary motion cannot be compensated out separately. Thus, one or more sensors (not shown) may be used as a reference for determining the precessional wave noise such as disclosed in U.S. Pat. No. 5,501,285 to Lamine et al, assigned to the assignee of the present application. However, the sensors are preferably partially isolated within the tool body 10 adjacent the receiver 24, avoiding the need to approximate a transfer function between the sensor and receiver 24.

With reference now to FIG. 2, an alternative embodiment of the present invention uses the processor to eliminate each noise signal from the acoustic signals to obtain the preferred signal by sending one or more amplitude inverted determined noise signals to one or more compensating transducers positioned within the tool body 10 that transmit a cancellation signal to receiver 24. The receiver 24 is positioned in the tool body 10 to receive the acoustic signals traversing the borehole 16 and formation 18, and noise signals propagating within the tool body 10, the borehole 16 and the interface between the borehole 16 and formation 18. The receiver 24 is positioned to receive the acoustic signals traversing the borehole 16 or formation 18 from a predetermined direction in order to obtain the preferred signal.

First, second, third, and fourth compensating acoustic transducers 38, 40, 42 and 44 are positioned within the tool body 10 to emit one or more cancellation signals determined by the processor 26. Each first, second, third, and fourth compensating transducer 38, 40, 42 and 44 may be connected to the processor 26 by respective circuits 39, 41, 43, and 45 to allow each compensating transducer to obtain its amplitude inverted noise signal from the processor 26. Thus, a corresponding number of sensors (not shown) are substantially isolated within the tool body 10 for providing the processor 26 with the noise signals detected by each sensor that the processor 26 uses to determine the noise signals at the receiver 24, using the method described under EXAMPLE 2 above. The processor 26 then inverts the amplitude for each determined noise signal before transmitting the amplitude inverted estimated unknown noise signals to each corresponding compensating transducer.

Each first and second compensating transducer 38 and 40 preferably transmits different cancellation signals corresponding with different types of noise, such as compressional wave or tube wave noise, since the transducers and corresponding sensors (not shown) are positioned above the receiver 24 for eliminating noise signals propagating from above the tool body 10. Similarly, each third and fourth compensating transducer 42 and 44 preferably transmits different cancellation signals for eliminating noise signals propagating from below the tool body 10. The cancellation signals transmitted from compensating transducers 38 or 40 may or may not be identical to the cancellation signals transmitted from compensating transducers 42 or 44.

The transmitter 22 and compensating transducers 38, 40, 42 and 44 are each normally calibrated before positioning the tool body 10 in the borehole 16. The transmitter 22 is preferably calibrated at the earth's surface above the formation 18 to allow the signal transmitted from the transmitter 22 to the receiver 24 to be isolated from any interfering noise signals propagating through the borehole 16. Alternatively, a moveable shield 50 may be positioned between the transmitter 22 and an aperture 52 in a wall 53 of the tool body 10 for calibrating the transmitter 22 while in the borehole 16 when the moveable shield 50 is in a closed position (FIG. 2).

Figure 3:
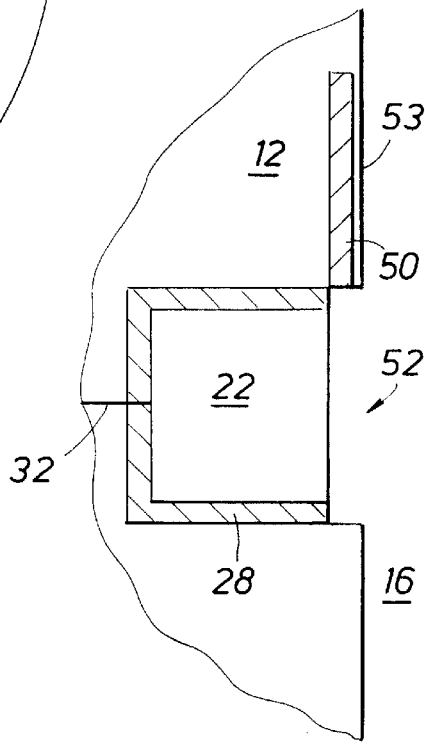
FIG. 3 is an enlarged, elevated, diagrammatic view of the transmitter depicted in FIGS. 1 and 2.

Conversely, the transmitter 22 is capable of transmitting the acoustic signals into the formation 18 when the moveable shield 50 is placed in an open position seen in FIG. 3. The shield 50 may be moved from the open to the closed position, or vice versa, by an actuator (not shown). Another calibration method places an additional compensating transducer (not shown) in close proximity to the transmitter 22 in order to calibrate the transmitter 22 corresponding to signals received by receiver 24 from such compensating transducer.

The first compensating transducer 38 may be calibrated while in the borehole 16 since it is already substantially isolated from the borehole 16, or may be calibrated according to the preferred method for calibrating the transmitter 22 at the earth's surface. Therefore, there is little risk that the receiver 24 will receive interfering noise signals propagating through the borehole 16 during calibration of the first compensating transducer 38.

Calibration of the first compensating transducer 38 may be performed by determining the transmission factor between the first compensating transducer 3 8 and the receiver 24 over a range of desired frequencies to be used in the measurement process while drilling the borehole 16. The calibration is accomplished by emitting random noise from the first compensating transducer 38 for receipt at the receiver 24, and is then sent to the processor 26 to be converted into a digital signal and processed for determination of the frequency domain transmission factor or $H(\omega)$.

The frequency domain transmission factor for the first compensating transducer 38 ($H(\omega)$) is determined by:

$$H(\omega) = \frac{R(\omega)}{C(\omega)}$$

where $\omega$ is the frequency ($s^{-1}$), $R(\omega)$ is the frequency domain signal observed at the receiver 24 and $C(\omega)$ is the frequency domain signal transmitted from the first compensating transducer 38. Here, $R(\omega)=F(R(t))$ and $C(\omega)=F(C(t))$, where F refers to the Fourier Transform, $R(t)$ is the time domain signal observed at the receiver 24 and $C(t)$ is the time domain signal transmitted from the first compensating transducer 38. The output of the first compensating transducer 38 should be calibrated according to its electrical input.

The frequency domain transmission factor $G(\omega)$ from the transmitter 22 to the receiver 24 is similarly calculated. The durations of the calibration signals used to calibrate the first compensating transducer 38 and transmitter 22 should be much greater than any two-way reflection time to be compensated out.

When a measurement is desired of the formation 18, an acoustic signal $T(t)$ is emitted from the transmitter 22, and first compensating transducer 38 is simultaneously activated to emit a first cancellation signal $C(t)$ defined by:

$$C(t) = F^{-1}\left[ T(\omega) \frac{G(\omega)}{H(\omega)} \right]$$

where $T(\omega)$ is the frequency domain signal observed at the transmitter 22 and $T(\omega)=F(T(t))$. $T(t)$ is fairly arbitrary and can be constructed as needed for the acoustic measurement. In this relation, we must specify that $G(\omega)=0$ when $H(\omega)=0$.

Alternatively, $C(t)$ may be determined by:

$$(t) = F^{-1}\left[ \frac{T(\omega)G(\omega)H(\omega)}{|H(\omega)|^2 + \alpha M_{ax}(|H(\omega)|)} \right] \quad (14)$$

$(|H(\omega)|^2)$

Here $\alpha$ is a small positive number between 0 and 1 for stability in the division. $C(t)$ will no longer provide an exact cancellation and it is best if, the range of frequencies to be used is such that:

$$\frac{|G(\omega)|}{M_{ax}|G(\omega)|} << 1 \quad (15)$$

Preferably, the electronic to acoustic transfer functions are also included in the calculations. If there is more than one receiver 24 then the calibration technique may be applied to each receiver one at a time.

If, however, the receiver 24 and processor 26 are not saturated by noise propagating through the drill collar 12, then the use of compensating transducers is unnecessary and $G(\omega)$ may be determined as before. The output of the receiver 24 is digitized and a drill collar signal ($F^{-1}(T)(\omega)$ $G(\omega)$) is subtracted from the preferred signal.

Accordingly, the remaining second, third and fourth compensating transducers 40, 42 and 44 are isolated within the tool body 10 and calibrated according to the preferred method for calibrating the first compensating transducer 38.

In operation, the tool 10 emits an acoustic signal from the transmitter 22 into the borehole 16 and formation 18. The acoustic signals from the transmitter 22 are reflected back to the receiver 24 as acoustic signals and one or more noise signals which are sent to a processor 26 as shown in FIG. 1. The noise signal is also detected by one or more sensors substantially isolated within the tool body 10 and positioned to detect the noise signals. Preferably, a first sensor 23 is isolated in the tool body 10 above the receiver 24 for detecting the noise signal propagating from above the tool body 10 toward the first sensor 23. A second sensor 27 may be isolated in the tool body 10 below the receiver 24 to detect the same or different noise signals propagating from below the tool body 10 toward the second sensor 27.

The acoustic signals traversing the borehole 16 and formation 18 and noise signal received by the receiver 24 and unknown noise signals detected by the first and second sensors 23 and 27 may then be processed into a preferred signal by a processor 26. The processor 26 determines the noise signal received at the receiver 24 by using the noise signal received at each first and second sensor 23 and 27 and a propagation factor for the noise signal between each first and second sensor 23 and 27 and the receiver 24. The determined noise signal is used to identify and eliminate the noise signal from the acoustic signals sensed by the receiver 24. Thus, the resulting preferred signal is indicative of either the borehole or formation properties.

The noise signals are preferably eliminated from the acoustic signals sensed by the receiver 24 by digitally filtering the determined noise signal from the combined acoustic signals and noise signals received by the receiver 24. Alternatively, the noise signals may be eliminated from the acoustic signals by inverting the amplitude of the determined noise signals and sending the inverted signal to a first compensating transducer 38 positioned within the tool body 10 to transmit cancellation signals to the receiver 24 as generally shown in FIG. 3.

The preferred borehole or formation signal is ultimately achieved by programming the processor 26 to include the known signal transmitted from the transmitter 22, and a corresponding transfer function according to whether the known transmitter signal to be eliminated is propagating through the borehole 16 or formation 18.

The preferred apparatus and method of the present invention may be employed with additional receivers, sensors, transmitters and/or compensating transducers contingent upon the various compressional, torsional and tube waves causing noise interference in the form of one or more noise signals. Although the invention has thus been described in detail for these embodiments, it should be understood that this explanation is for illustration only and that the invention is not limited to these embodiments. Alternate components and installation techniques will be apparent to those skilled in the art in view of this disclosure. Additional modifications are thus contemplated and may be made without departing from the spirit of the invention, which is defined by the claims.

What is claimed is:

1. An apparatus for conducting acoustic logging measurements of formations surrounding an earth borehole, comprising:

an acoustic logging instrument having first and second threaded ends for threadedly connecting said instrument into a drillstring used for drilling earth boreholes, said logging instrument comprising an acoustic transmitter for transmitting acoustic signals into the formations surrounding said earth borehole, an acoustic receiver for receiving acoustic signals returning from said formations and for receiving acoustic noise signals, an acoustic sensor responsive only to acoustic noise signals, to the exclusion of the acoustic signals returning from said formations, and an electronic processor in said instrument for combining the signals received by said acoustic receiver and by said acoustic sensor to produce signals substantially free of said acoustic noise signals.

2. The apparatus according to claim 1, wherein said electronic processor comprises an analog-to-digital converter and said received acoustic signals returning from the earth formation and said received acoustic noise signals are converted from analog to digital form prior to being combined to produce signals substantially free of said acoustic noise signals.

3. The apparatus according to claim 2, comprising circuitry for generating a propagation factor relating to the propagation of acoustic signals between said acoustic receiver and said acoustic sensor, and for modifying the acoustic noise signals based upon said propagation factor prior to being combined with the acoustic signals returning from the earth formations to produce signals substantially free of said acoustic noise signals.

4. An apparatus for conducting acoustic logging measurements of formations surrounding an earth borehole, comprising:

an acoustic logging instrument having first and second threaded ends for threadedly connecting said instrument into a drillstring used for drilling earth boreholes, said logging instrument comprising an acoustic transmitter for transmitting acoustic signals into the formations surrounding said earth borehole, at least two acoustic receivers for receiving acoustic signals returning from said formation and for receiving acoustic noise signals, an acoustic sensor responsive only to acoustic noise signals, to the exclusion of the acoustic signals returning from said formations, and an electronic processor in said instrument for combining the signals received by said acoustic receivers and by said acoustic sensor to produce signals substantially free of said acoustic noise signals.

5. The apparatus according to claim 4, wherein said electronic processor comprises an analog-to-digital converter and said received acoustic signals returning from the earth formation and said received acoustic noise signals are converted from analog to digital form prior to being combined to produce signals substantially free of said acoustic noise signals.

6. The apparatus according to claim 5, comprising circuitry for generating one or more propagation factors relating to the propagation of acoustic signals between said acoustic receivers and said acoustic sensor, and for modifying the acoustic noise signals based upon said propagation factors prior to being combined with the acoustic signals returning from the earth formation to produce signals substantially free of said acoustic noise signals.

7. An apparatus for conducting acoustic logging measurements of formations surrounding an earth borehole, comprising:

an acoustic logging instrument having first and second threaded ends for threadedly connecting said instrument into a drillstring used for drilling earth boreholes, said logging instrument comprising an acoustic transmitter for transmitting acoustic signals into the formations surrounding said earth borehole, at least two acoustic receivers for receiving acoustic signals returning from said formation and for receiving acoustic noise signals, at least two acoustic sensors responsive only to acoustic noise signals, to the exclusion of the acoustic signals returning from said formations, and an electronic processor in said instrument for combining the signals received by said acoustic receivers and by said acoustic sensors to produce signals substantially free of said acoustic noise signals.

8. The apparatus according to claim 7, wherein said electronic processor comprises an analog-to-digital converter and said received acoustic signals returning from the earth formation and said received acoustic noise signals are converted from analog to digital form prior to being combined to produce signals substantially free of said acoustic noise signals.

9. The apparatus according to claim 8, comprising circuitry for generating one or more propagation factors relating to the propagation of acoustic signals between said acoustic receivers and said acoustic sensors, and for modifying the acoustic noise signals based upon said propagation factors prior to being combined with the acoustic signals returning from the earth formation to produce signals substantially free of said acoustic noise signals.

10. The apparatus according to claim 7, wherein each of said acoustic sensors is positioned within said logging instrument to detect noise signals propagating towards the said sensors.

11. The apparatus according to claim 7, wherein at least one of said acoustic sensors is positioned to detect a noise signal propagating from above and toward the one sensor, and at least another of said acoustic sensors is positioned to detect a noise signal propagating from below and toward the one sensor.

12. An apparatus for conducting acoustic logging measurements of formations surrounding an earth borehole, comprising:

an acoustic logging instrument having first and second threaded ends for threadedly connecting said instrument into a drillstring used for drilling earth boreholes, said logging instrument comprising an acoustic transmitter for transmitting acoustic signals into the formations surrounding said earth borehole, an acoustic receiver for receiving acoustic signals returning from said formation and for receiving acoustic noise signals, at least two acoustic sensors responsive only to acoustic noise signals, to the exclusion of the acoustic signals returning from said formations, and an electronic processor in said instrument for combining the signals received by said acoustic receivers and by said acoustic sensors to produce signals substantially free of said acoustic noise signals.

13. The apparatus according to claim 12, wherein said electronic processor comprises an analog-to-digital converter and said received acoustic signals returning from the earth formation and said received acoustic noise signals are converted from analog to digital form prior to being combined to produce signals substantially free of said acoustic noise signals.

14. The apparatus according to claim 13, comprising circuitry for generating one or more propagation factors relating to the propagation of acoustic signals between said acoustic receiver and said acoustic sensors, and for modifying the acoustic noise signals based upon said propagation factors prior to being combined with the acoustic signals returning from the earth formation to produce signals substantially free of said acoustic noise signals.

15. An apparatus for conducting acoustic caliber measurements of an earth formation borehole, comprising:

an acoustic logging instrument having first and second threaded ends for threadedly connecting said instrument into a drillstring used for drilling earth boreholes, said logging instrument comprising an acoustic transmitter for transmitting acoustic signals into said earth formation borehole, an acoustic receiver for receiving acoustic signals returning from the borehole wall and for receiving acoustic noise signals, an acoustic sensor responsive only to acoustic noise signals, to the exclusion of the acoustic signals returning from said borehole wall, and an electronic processor in said instrument for combining the signals received by said acoustic receiver and by said acoustic sensor to produce signals substantially free of said acoustic noise signals.

16. The apparatus according to claim 15, wherein said electronic processor comprises an analog-to-digital converter and said received acoustic signals returning from the earth formation and said received acoustic noise signals are converted from analog to digital form prior to being combined to produce signals substantially free of said acoustic noise signals.

17. The apparatus according to claim 16, comprising circuitry for generating a propagation factor relating to the propagation of acoustic signals between said acoustic receiver and said acoustic sensor, and for modifying the acoustic noise signals based upon said propagation factor prior to being combined with the acoustic signals returning from the earth formation to produce signals substantially free of said acoustic noise signals.

18. An apparatus for conducting acoustic caliper measurements of an earth formation borehole, comprising:

an acoustic logging instrument having first and second threaded ends for threadedly connecting said instrument into a drillstring used for drilling earth boreholes, said logging instrument comprising an acoustic transmitter for transmitting acoustic signals into said earth formation borehole, an acoustic receiver for receiving acoustic signals returning from the borehole wall and for receiving acoustic noise signals, at least two acoustic sensors responsive only to acoustic noise signals, to the exclusion of the acoustic signals returning from said borehole wall, and an electronic processor in said instrument for combining the signals received by said acoustic receiver and by said acoustic sensors to produce signals substantially free of said acoustic noise signals.

19. The apparatus according to claim 18, wherein said electronic processor comprises an analog-to-digital converter and said received acoustic signals returning from the earth formation and said received acoustic noise signals are converted from analog to digital form prior to being combined to produce signals substantially free of said acoustic noise signals.

20. The apparatus according to claim 19, comprising circuitry for generating one or more propagation factors relating to the propagation of acoustic signals between said acoustic receiver and said acoustic sensors, and for modifying the acoustic noise signals based upon said propagation factors prior to being combined with the acoustic signals returning from the earth formation to produce signals substantially free of said acoustic noise signals.

21. A method for conducting acoustic logging measurements of formations surrounding an earth borehole, comprising:

positioning an acoustic well logging instrument in a drillstring adjacent an earth formation to be logged;

transmitting acoustic signals into said earth formation;

receiving at a first location in said instrument acoustic signals returning from said earth formation, combined with acoustic noise signals;

detecting acoustic noise signals at a second location in said instrument not combined with said acoustic signals returning from said earth formation; and processing said acoustic signals received at said first location with the acoustic signals received at said second location to produce acoustic signals substantially free of acoustic noise signals.

22. The method according to claim 21, wherein said noise signals are in the form of compressional wave noise that propagates along and through the well logging instrument.

23. The method according to claim 21, wherein the noise signals are in the form of noise from torsional waves that propagates along and through the well logging instrument.

24. The method according to claim 21, wherein the noise signals are in the form of noise from lateral waves that propagates along and through the well logging instrument.

25. The method according to claim 21, wherein the noise signals are in the form of noise from precessional movement and random vibration of the well logging instrument.

26. The method according to claim 21, wherein the source of the noise signal is a drill bit connected in the drillstring below the well logging instrument.

27. A method for conducting acoustic logging measurements of formations surrounding an earth borehole, comprising:

positioning an acoustic well logging instrument in a drillstring adjacent an earth formation to be logged;

transmitting acoustic signals into said earth formation;

receiving at first and second locations in said instrument acoustic signals returning from said earth formation, combined with acoustic noise signals;

detecting acoustic noise signals at a third location in said instrument not combined with said acoustic signals returning from said earth formation; and processing said acoustic signals received at said first and second locations with the acoustic signals received at said third location to produce acoustic signals substantially free of acoustic noise signals.

28. A method for conducting acoustic logging measurements of formations surrounding an earth borehole, comprising:

positioning an acoustic well logging instrument in a drillstring adjacent an earth formation to be logged;

transmitting acoustic signals into said earth formation;

receiving at first and second locations in said instrument acoustic signals returning from said earth formation, combined with acoustic noise signals;

detecting acoustic noise signals at third and fourth locations in said instrument not combined with said acoustic signals returning from said earth formation; and processing said acoustic signals received at said first and second locations with the acoustic signals received at said third and fourth locations to produce acoustic signals substantially free of acoustic noise signals.

29. A method for conducting acoustic logging measurements of formations surrounding an earth borehole, comprising:

positioning an acoustic well logging instrument in a drillstring adjacent an earth formation to be logged;

transmitting acoustic signals into said earth formation;

receiving at a first location in said instrument acoustic signals returning from said earth formation, combined with acoustic noise signals;

detecting acoustic noise signals at second and third locations in said instrument not combined with said acoustic signals returning from said earth formation ; and processing said acoustic signals received at said first location with the acoustic signals received at said second and third locations to produce acoustic signals substantially free of acoustic noise signals.

* * * * *